US 11,483,800 B2

(12) United States Patent
Wang et al.

(10) Patent No.: US 11,483,800 B2
(45) Date of Patent: Oct. 25, 2022

(54) METHOD AND DEVICE FOR RESOURCE ALLOCATION AND SIDELINK COMMUNICATION

(71) Applicant: Samsung Electronics Co., Ltd, Suwon-si (KR)

(72) Inventors: Yi Wang, Beijing (CN); Shichang Zhang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 16/638,128

(22) PCT Filed: Aug. 10, 2018

(86) PCT No.: PCT/KR2018/009198
§ 371 (c)(1),
(2) Date: Feb. 10, 2020

(87) PCT Pub. No.: WO2019/031926
PCT Pub. Date: Feb. 14, 2019

(65) Prior Publication Data
US 2020/0221423 A1 Jul. 9, 2020

(30) Foreign Application Priority Data

Aug. 10, 2017 (CN) .......................... 201710682642.8
Aug. 11, 2017 (CN) .......................... 201710684283.X
Jul. 16, 2018 (CN) .......................... 201810780003.X

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04W 72/0446* (2013.01);
(Continued)

(58) Field of Classification Search
CPC ............. H04W 72/02; H04W 72/0446; H04W 72/0453; H04W 72/10; H04W 74/0808; H04W 92/18; H04W 4/40; H04B 17/318
See application file for complete search history.

(56) References Cited

U.S. PATENT DOCUMENTS

| 2017/0048888 A1* | 2/2017 | Belleschi .............. H04W 8/005 |
| 2017/0230939 A1* | 8/2017 | Rudolf .................. H04W 92/18 |

(Continued)

FOREIGN PATENT DOCUMENTS

WO 2017/007184 A1 1/2017

OTHER PUBLICATIONS

Samsung, "High order modulation in V2X", 3GPP TSG RAN WG1 Meeting #89, May 15-19, 2017, R1-1707906, 3 pages.
(Continued)

*Primary Examiner* — Michael K Phillips

(57) ABSTRACT

The present disclosure provides a resource allocation method and a User Equipment (UE). The resource allocation method includes the following steps as configuring one or more resource pools, and sensing, by a UE, each configured resource pool to obtain a result of sensing, selecting, from a set of remaining candidate single time unit resources of each resource pool contained in the result of sensing, one candidate single time unit resource as a transmission resource, and transmitting, via the transmission resource, a packet to be transmitted which is borne by the transmission resource. The present disclosure also provides a method of sidelink communication performed by a control user equipment (CUE), which comprises determining transmission resources and
(Continued)

reception resources for internal communication, transmitting data to member user equipments (MUEs) in the determined transmission resources, and receiving data from the MUEs in the determined reception resources.

18 Claims, 21 Drawing Sheets

(51) Int. Cl.
    *H04W 72/04*     (2009.01)
    *H04W 72/10*     (2009.01)
    *H04W 74/08*     (2009.01)
    *H04W 92/18*     (2009.01)

(52) U.S. Cl.
    CPC ....... *H04W 72/0453* (2013.01); *H04W 72/10* (2013.01); *H04W 74/0808* (2013.01); *H04W 92/18* (2013.01)

(56) References Cited

U.S. PATENT DOCUMENTS

| | | | |
|---|---|---|---|
| 2018/0014174 A1* | 1/2018 | Zhou | H04W 48/16 |
| 2018/0192397 A1 | 7/2018 | Seo | |
| 2019/0363779 A1* | 11/2019 | Chae | H04B 7/14 |
| 2020/0029245 A1* | 1/2020 | Khoryaev | H04W 72/0486 |
| 2020/0170009 A1* | 5/2020 | Chae | H04W 24/10 |
| 2020/0178343 A1* | 6/2020 | Kim | H04W 76/27 |
| 2020/0296692 A1* | 9/2020 | Lee | H04W 52/346 |
| 2021/0022035 A1* | 1/2021 | Lee | H04W 74/002 |

OTHER PUBLICATIONS

Intel Corporation, "Resource Selection Latency Reduction for LTE V2V Sidelink Communication", 3GPP TSG RAN WG1 Meeting #89, May 15-19, 2017, 5 pages.

Intel Corporation, "Sidelink Resource Allocation and Configuration for Wearable and IoT Use Cases", 3GPP TSG RAN WG1 Meeting #89, May 15-19, 2017, R1-1707333, 8 pages.

Nokia et al., "Sidelink resource allocation with relay UE", 3GPP TSG RAN WG1 Meeting #89, May 15-19, 2017, R1-1708564, 7 pages.

Notification of Transmittal of the International Search Report and the Written Opinion of the International Searching Authority, or the Declaration dated Nov. 21, 2018 in connection with PCT/KR2018/009198, 17 pages.

* cited by examiner

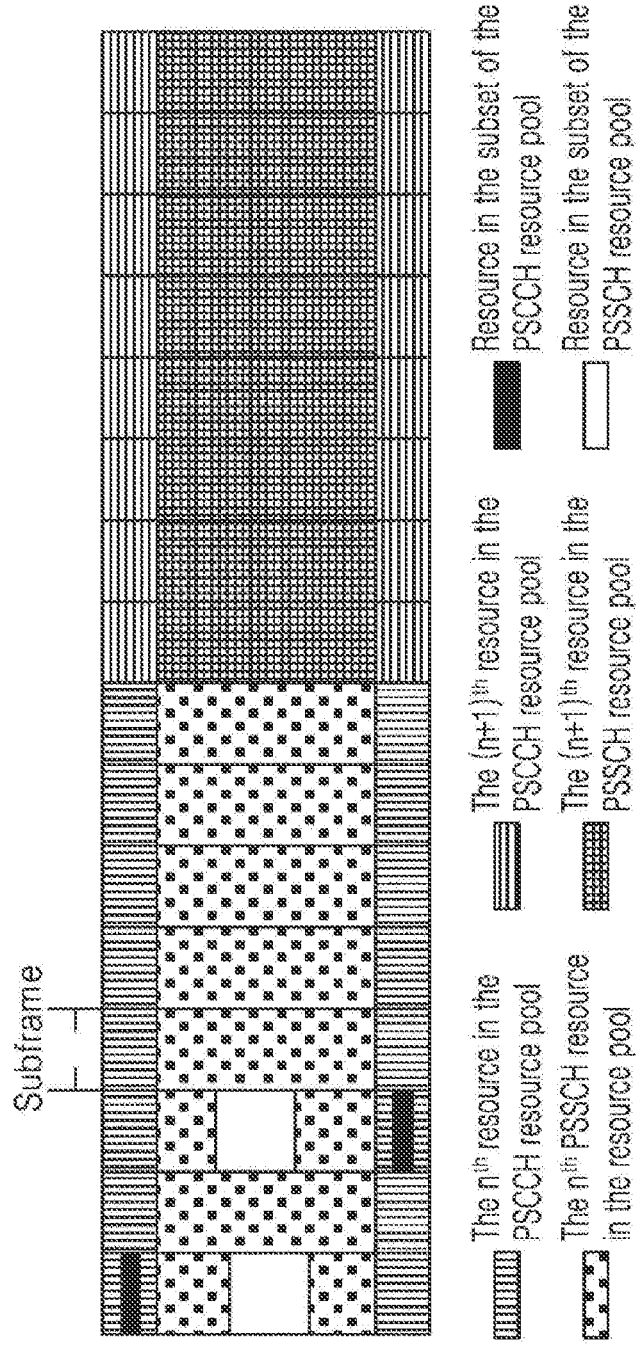

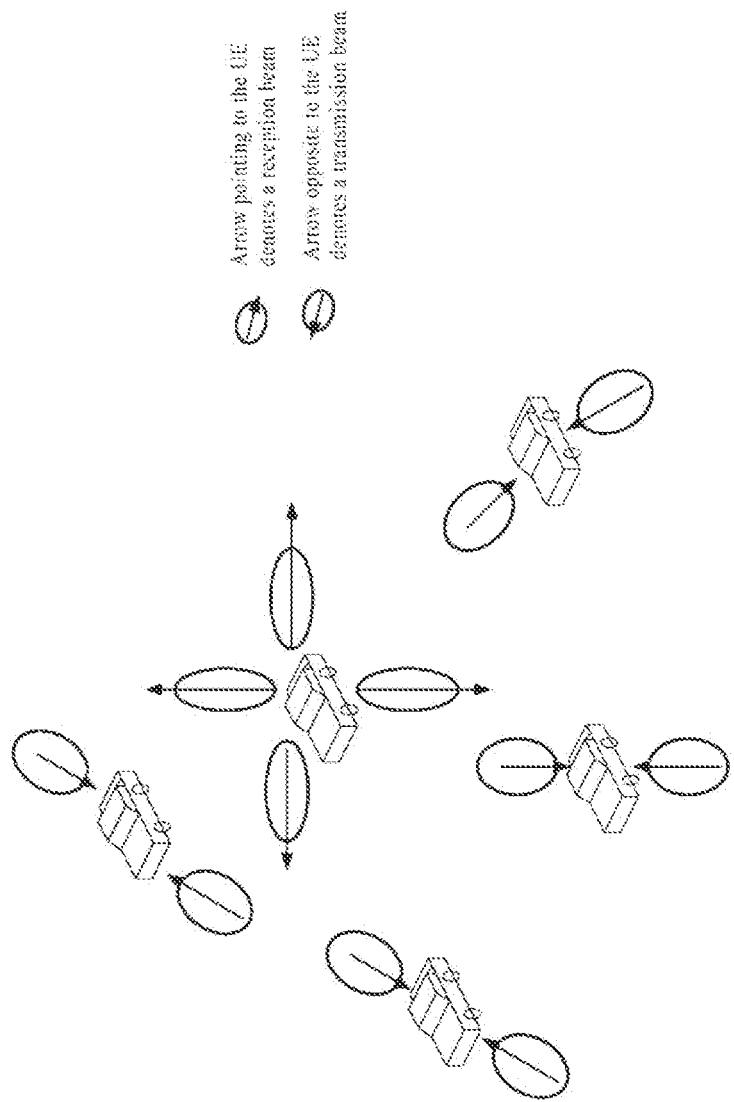

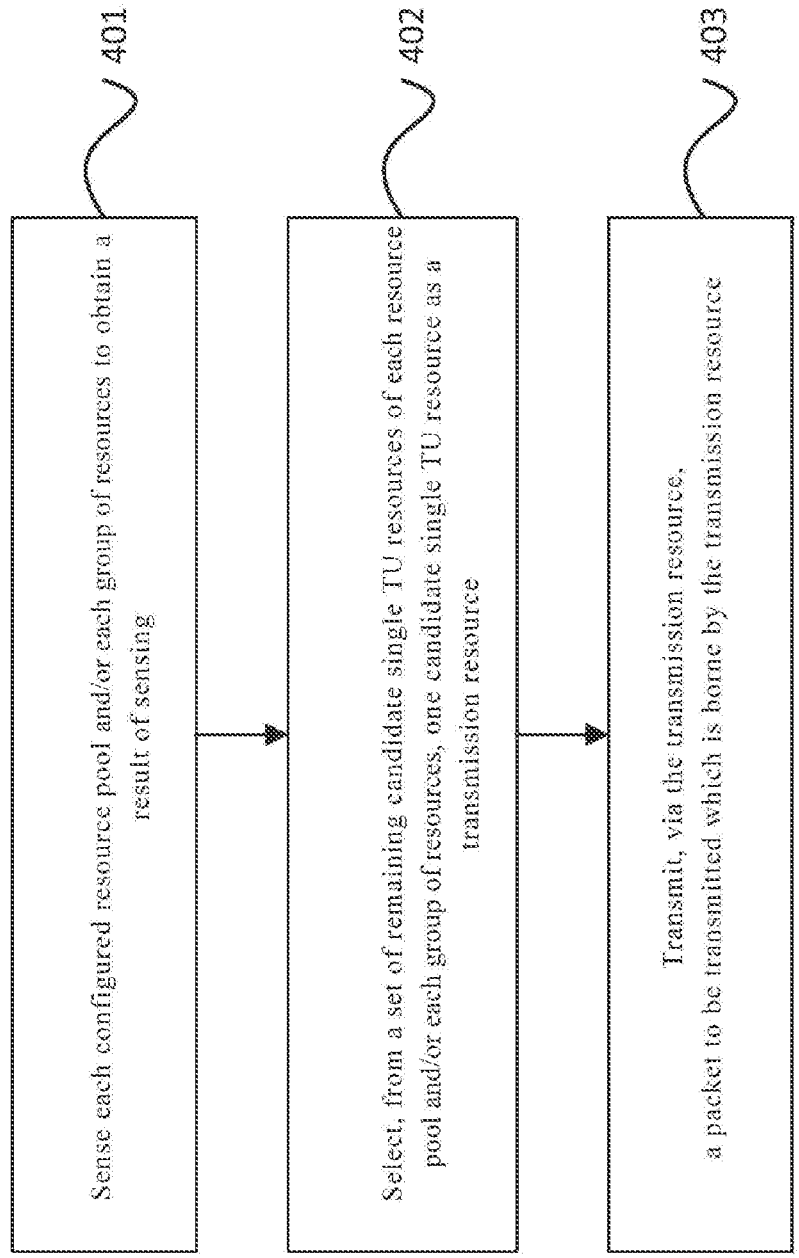

METHOD AND DEVICE FOR RESOURCE ALLOCATION AND SIDELINK COMMUNICATION

CROSS-REFERENCE TO RELATED APPLICATIONS

This application is a 371 of International Application No. PCT/KR2018/009198 filed on Aug. 10, 2018, which claims priority to Chinese Patent Application No. 201710682642.8 filed on Aug. 10, 2017, Chinese Patent Application No. 201710684283.X filed on Aug. 11, 2017, and Chinese Patent Application No. 201810780003.X filed on Jul. 16, 2018, the disclosures of which are herein incorporated by reference in their entireties.

BACKGROUND

1. Field

The present disclosure relates to the technical field of communications, and in particular to a resource allocation method and a device for resource allocation for sidelink communication.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

An objective of the present invention is to solve at least one of the technical defects, particularly the problem on how to realize efficient resource allocation and further improve the transmission performance of a UE.

BRIEF DESCRIPTION OF THE DRAWINGS

The above and/or additional aspects and advantageous of the present disclosure will become apparent and be more readily appreciated from the following descriptions of embodiments, with reference to the accompanying drawings, in which:

FIG. 2 is a schematic diagram of resources for a PSSCH/PSCCH for LTE V2X in the prior art.

FIG. 3C is a third schematic diagram of transmission and reception by a V2X UE based on beams in the prior art.

FIG. 4 is a schematic flowchart of a resource allocation method according to an embodiment of the present disclosure.

DETAILED DESCRIPTION

Figure 1:
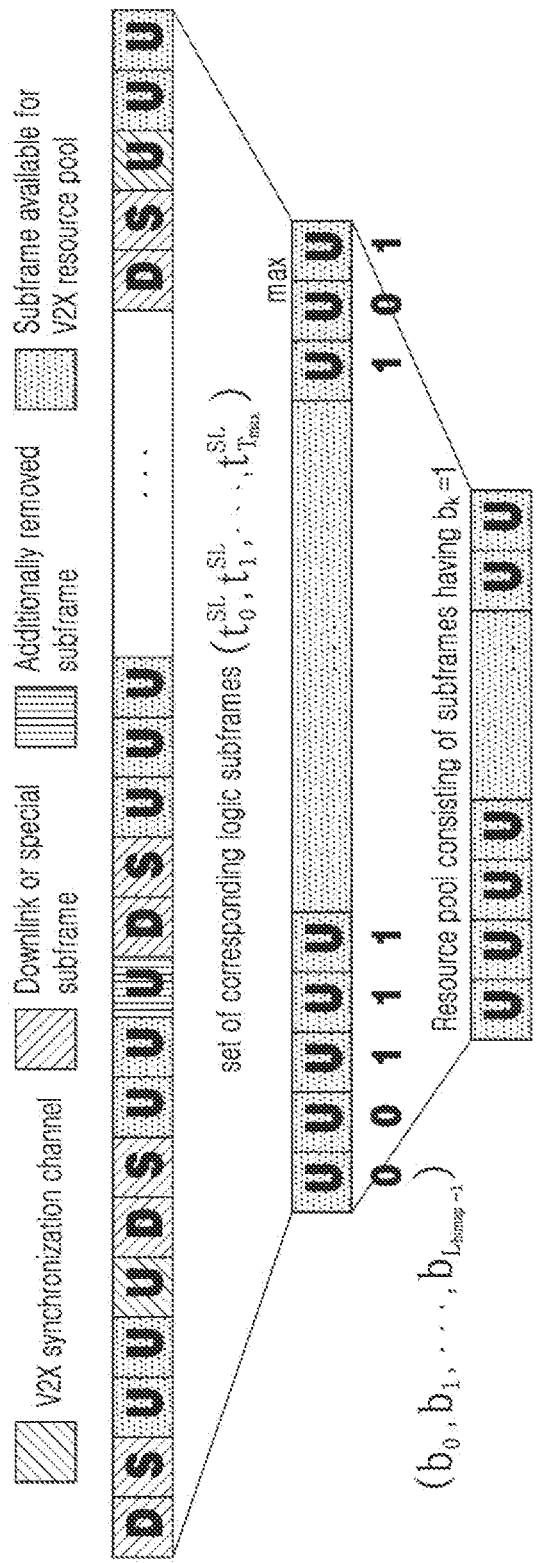
FIG. 1 is a schematic diagram of a method for indicating a resource pool in LTE V2X in the prior art.

An objective of the present disclosure is to solve at least one of the technical defects, particularly the problem on how to realize efficient resource allocation and further improve the transmission performance of a UE.

The present disclosure provides a resource allocation method and a user equipment. The resource allocation method of the present disclosure includes the following steps of: sensing each configured resource pool to obtain a result of sensing, the result of sensing containing a set of remaining single time unit (TU) resources of each resource pool; selecting, from the set of remaining candidate single TU resources of each resource pool, one candidate single TU resource as a transmission resource; and transmitting, via the transmission resource, a packet to be transmitted which is borne by the transmission resource; wherein the candidate single TU resource is a time-frequency resource which consists of N TUs and M PRBs and is used for transmitting a same packet, where N>1 and M≥1.

Preferably, at least two resource pools are configured by multiple configuration signaling, respectively; resources in the at least two configured resource pools are independent from each other; or, resources in the at least two resource pools satisfy a predefined relationship.

Preferably, one of at least two resource pools is configured by the configuration signaling, and the other one or more of the at least two resource pools is determined according to the one resource pool and a predefined relationship.

Preferably, if a UE is capable of transmitting by beams, and if multiple transmission resource pools are configured, the UE can transmit by different transmission beams in different transmission resource pools. In a same transmission resource pool, data is transmitted by a same transmission beam.

Preferably, if a UE is capable of receiving by beams, and if multiple reception resource pools are configured, the UE can receive by different reception beams in different reception resource pools. In a same reception resource pool, data is received by a same reception beam.

Preferably, the step of sensing each configured resource pool to obtain a result of sensing includes: receiving, within a sensing window of a transmission resource pool, Physical Sidelink Control Channels (PSCCHs) transmitted by other User Equipments (UEs), and determining time-frequency resources and priorities for Physical Sidelink Shared Channels (PSSCHs) according to the PSCCHs; performing PSSCH-RSRP measurement on the PSSCHs based on the time-frequency resources, and determining, according to the priority of each PSSCH, whether an RSRP measurement value of each PSSCH is higher than a predefined threshold; and if the RSRP measurement value of the PSSCH is higher than the predefined RSRP threshold and a corresponding time-frequency resources is located within a resource selection window of the transmission resource pool, excluding the time-frequency resource; if the number of remaining candidate single TU resources except for the time-frequency resource is less than a predefined threshold value, increasing the predefined RSRP threshold, and re-excluding a time-frequency resource until the number of remaining candidate single TU resources is greater than or equal to the predefined threshold value.

Preferably, the excluded time-frequency resource in each resource pool uses the candidate single TU resource, which consists of N TUs and M PRBs and is used for transmitting a same data, as granularity.

Preferably, the excluded time-frequency resource in each resource pool uses a time-frequency resource consisting of M PRBs within one TU as granularity.

Preferably, if the remaining time-frequency resources contain a time-frequency resource for which no candidate single TU resource granularity can be formed, the time-frequency resource is removed.

Preferably, the step of selecting, from the set of candidate single TU resources of each resource pool, one candidate single TU resource as a transmission resource includes: calculating a Sidelink Received Signal Strength Indicator (S-RSSI) of the remaining candidate single TU resources in each transmission resource pool; selecting a predefined number of candidate single TU resources in an order from the smallest to the largest S-RSSI; and selecting, from the predefined number of candidate single TU resources, one candidate single TU resource as a transmission resource.

Preferably, there is a predefined pattern relationship between N TUs in the candidate single TU resource.

Preferably, a difference in time between the first TU and the last TU among N TUs in the candidate single TU resource does not exceed a predefined time threshold.

Preferably, the method further includes: receiving PSCCHs and/or PSSCHs in a reception resource pool; and acquiring N TUs in a candidate single TU resource bearing the PSCCHs and/or PSSCHs.

Preferably, a frequency-domain relationship between TUs among the N TUs is determined in any one of the following situations: the N TUs use same frequency-domain resources; the N TUs use different frequency-domain resources and a relationship between the frequency-domain resources corresponding to the N TUs is predefined; and the N TUs satisfy a predefined pattern relationship.

Preferably, when the N TUs use different frequency-domain resources, the method further includes: detecting a position of a frequency-domain resource for each of the N TUs; and determining a position of a PSCCH within each TU according to the position of the frequency-domain resource.

Preferably, when the N TUs do not satisfy the predefined pattern relationship, the method further includes: receiving a PSCCH and/or a PSSCH within at least one of the N TUs; and acquiring information indicative of the time and/or frequency domain of a PSCCH and/or a PSSCH of at least one another TU carried in the PSCCH.

Preferably, at least one of the following processes is performed to transmit a packet: determining transmission parameters in each resource pool according to a Channel Busy Ratio (CBR) of TUs in each resource pool; calculating an Occupancy Ratio (CR) of resources in each resource pool and/or the maximum value of the CR of resources, respectively; determining reserved resources for transmitting the packet in each resource pool; and determining, according to the CBR and priority of each resource pool, whether to discard the reserved resources.

Preferably, the packet to be transmitted is transmitted and/or received based on beams.

Preferably, for a group of UEs, the direction of transmission beams within each corresponding transmission resource pool complies with a same rule; and/or for a group of UEs, the direction of reception beams within each corresponding reception resource pool complies with a same rule.

Preferably, any one of the following processing procedure is determined according to a service type: configuring a resource pool; determining a candidate single TU resource; selecting a transmission resource on the basis of sensing; and determining the direction of a transmission and/or reception beam.

The present invention further provides a user equipment, including: a first processing unit configured to sense each configured resource pool to obtain a result of sensing, the result of sensing containing a set of remaining candidate single TU resources of each resource pool; a second processing unit configured to select, from the set of remaining candidate single TU resources of each resource pool, one candidate single TU resource as a transmission resource; and a transmitting unit configured to transmit, via the transmission resource, a packet to be transmitted which is borne by the transmission resource; wherein the candidate single TU resource is a time-frequency resource which consists of N TUs and M PRBs and is used for transmitting a same packet, where N>1 and M≥1.

With the present invention, the high efficiency of resource allocation is achieved, and the transmission performance of a UE is thus improved.

The application is provided to solve at least one of the problems above. Particularly, an improved V2X communication method is provided, which can ensure the confidentiality and directionality of the internal communication of the automatic platooning, and can support the requirements of internal communication in the automatic platooning so that the resource utilization efficiency may be improved.

The present disclosure provides a method of sidelink communication performed by a control user equipment (CUE), including: determining a transmission resource and a reception resource for internal communication; transmitting data to a member user equipment (MUE) in the determined transmission resource; and receives data from the MUE in the determined reception resource.

Preferably, the determining the one or more first transmission resource and the one or more first reception resource for internal communication for each MUE in the group and the determining the one or more second transmission resources and the one or more second reception resources for internal communication for the CUE comprising: determining the carrier and the configuration of resource pool for the internal communication by receiving a signaling from a base station; and determining the locations of the first transmission resource, the first reception resource, the one or more second transmission resources, and the one or more second reception resource within the resource pool corresponding to the configuration of the resource pool in the carrier by receiving the indication in the downlink control channel from the base station.

Preferably, the determining the one or more first transmission resource and the one or more first reception resource for internal communication for each MUE in the group and the determining the one or more second transmission resources and the one or more second reception resources for internal communication for the CUE comprising: determining the carrier and the configuration of resource pool for the internal communication by receiving a signaling from a base station; and selecting the locations of the first transmission resource, the first reception resource, the one or more second transmission resources, and the one or more second reception resources within the resource pool corresponding to the configuration of the resource pool in the carrier.

Preferably, the method further comprises: selecting a carrier within a range and determining the configuration of resource pool in the carrier, and selecting the locations of the first transmission resource, the first reception resource, the second transmission resources, and the second reception resources within the resource pool corresponding to the configuration of the resource pool in the carrier.

Preferably, for each MUE in the group, at least one of the one or more second transmission resources used by the CUE for the internal communication is the same as the first reception resource determined for the MUE, and at least one of the one or more second reception resources used by the CUE for the internal communication is the same as the first reception resource determined for the MUE; and for each MUE in the group, transmitting the first transmission resource and the first reception resource to the MUE.

Preferably, the method further comprises indicating the MUEs the new first transmission resource in fixed time slots of each transmission period, wherein the transmission period is consist of a fixed number of time slots in the resource pool.

Preferably, for the UE with index i in the group, the determined transmission resource is a time slot with index n in the resource pool for the internal communication, wherein n mod M=i, and M is the number of UEs in the group.

Preferably, for the UEs with index 2t in the group, the determined transmission resources are the even-numbered time slots in the resource pool for the internal communication; and for the UEs with index 2t+1 in the group, the determined transmission resources are the odd-numbered time slots in the resource pool for the internal communication, wherein t is a non-negative integer.

Preferably, the second reception resource used by the CUE for internal communication is the same as the first transmission resources determined by its neighboring MUEs; and for each MUE in the group, the determined first reception resources are the same as the transmission resources of its neighboring UEs.

Preferably, the CUE transmits information of the first transmission resource and the first reception resource of each MUE in the group to its neighboring MUEs, so that the MUEs sequentially forward the information to notify the first transmission resource and the first reception resource of each MUE in the group.

Preferably, the CUE selects a relay MUE among the MUEs except the last one based on the geographical locations of the MUEs, the PSSCH reference signal received quality (PSSCH-RSRQ) transmitted by other UEs in the group measured by the MUEs.

Preferably, determining that the one or more second reception resources of the CUE only include the first transmission resource of the MUE that is the relay node; determining that the one or more first reception resources of the MUE that is the relay node includes the transmission resources of all other MUEs and CUEs in the group; and determining that the first reception resource of all other MUEs in the group includes at least the first transmission resource of the MUE that is the relay node.

The present disclosure provides, a method of sidelink communication performed by a member user equipment (MUE) is provided, including: determining a transmission resource and a reception resource for internal communication; transmitting data in the determined transmission resource; and receiving data in the determined reception resource.

Preferably, the first transmission resource of the MUE is the same as at least one of the one or more second reception resources used by the CUE for internal communication; and the first reception resource of the MUE is the same as at least one of the one or more second transmission resources used by the CUE for internal communication.

Preferably, if the index of the MUE is i, the determined transmission resource is the time slot with the index n in the resource pool for internal communication, where n mod M=i, and M is the number of UEs in the group.

Preferably, if the index of the MUEs is i=2t, the determined transmission resources are even-numbered time slots in the resource pool for internal communication; and if the index of the MUEs is i=2t+1, the determined transmission resources are odd-numbered time slots in the resource pool for internal communication, wherein t is a non-negative integer.

Preferably, the determined reception resource of a MUE is the same as the transmission resource of its neighboring UE; and the data transmitted by the MUE includes the information from itself and the information received from UEs with indexes i+1 and i−1.

Preferably, if the MUE is the last one in the group, besides the information from itself and the information received from the UE with index i−1, the transmitted information includes the configuration of the resource pool of the group and the latest received transmission control information.

Preferably, when noticing that another MUE leaves from the group, comparing the index of the another MUE with its own index, and if its own index is larger than that of the another MUE, decrementing its own index by 1; and receiving data from other UEs, the data being transmitted in the re-determined transmission resources of the other UEs based on their new indexes.

Preferably, transmitting the measured received quality of PSSCH reference signal (PSSCH-RSRQ) transmitted by other UEs in the group to the CUE, and based on the signaling from the CUE, determining itself to be a relay MUE.

Preferably, the time slot in which the transmission resource of the relay MUE is located is different from the time slot in which the transmission resource of any other UE in the group is located.

Preferably, the MUE, as the relay node, collects data from other UEs in the group and forwards it to the other UEs in the group.

The present disclosure provides, a device for sidelink is provided, including: resource determination module, configured to determine the locations of a transmission resource and a reception resource; data transmission module, configured to transmit data in the determined transmission resource; and the data reception module, configured to receive data in the determined reception resource.

Through the method and device for sidelink communication provided by the present application, the distance between the transmitter and receiver can be shortened as much as possible, and the propagation of wireless signal is ensured to be the line of sight (LOS, Line of Sight) transmission. The path of signal transmission to the receiver is not blocked, so that the data may be transmitted successful only with a tiny transmission power. Through the method provided in the present application, the security of the data communication within the group can be ensured, and meanwhile the efficiency for utilizing the wireless resources may be improved.

Additional aspects and advantages of the present invention will be partially appreciated and become apparent from the descriptions below, or will be well learned from the practices of the present invention.

MODE FOR INVENTION

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements there between. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

Hereinafter, unless otherwise specified, a UE refers to the UE belonging to an auto platooning, and the UE may be a CUE or a MUE. A time slot indicates the minimum time granularity for transmitting on the PSSCH by the first UE, and a physical resource block (PRB) indicates the minimum granularity of frequency domain resource. The transmission resource and reception resource refer to the resources for internal communication. In the present application, it is assumed that any of the UEs in the auto platooning can determine its own location and the locations of other UEs in the platooning relatively accurately.

In a Long Term Evolution (LTE) system of the 3GPP standardization organization, both a communication (called a cellular communication) between a UE terminal and a base station and a V2X (Vehicle to Vehicle/Pedestrian/Infrastructure/Network) communication are supported. In a V2X system, a UE transmits a Scheduling Assignment (SA) indicative of information such as the time-frequency resource occupied by a data channel and a Modulation and Coding Scheme (MCS); and, the UE transmits data on a data channel scheduled by the SA. In an LTE D2D (Device-to-Device)/V2X system, the SA is also referred to as a Physical Sidelink Control Channel (PSCCH), and the data channel is also referred to as a Physical Sidelink Shared Channel (PSSCH). A set of PSCCH resources is called a PSCCH resource pool, and a set of PSSCH resources is called a PSSCH resource pool.

On a carrier in the V2X system, subframes occupied by a V2X synchronization channel are removed, and some reserved subframes are also removed, so that the number of remaining subframes within a System Frame Number (SFN) period is an integral multiple of the bitmap length $L_{bitmap}$ of the configured resource pool. In a Time Division Duplexing (TDD) system, it is also necessary to remove all downlink subframes, and a set of remaining subframes is denoted by $(t_0^{SL}, t_1^{SL}, t_{Tmax}^{SL})$, where $0 \le t_i^{SL} < 10240$, and $0 \le i < T_{max}$ is the logical number of a remaining subframe. In the set $(t_0^{SL},$ $t_1^{SL}, t_{Tmax}^{SL})$, a resource pool is defined by a bitmap $(b_0, b_1, \ldots, b_{Lbitmap-1})$ having a length of $L_{bitmap}$. When $b_k=1$ and $k'=k \bmod L_{bitmap}$, a subframe $t_k^{SL}$ belongs to the resource pool, as shown FIG. 1. Therefore, a resource pool for V2X is defined based on a logical subframe.

As shown in FIG. 2, both the PSCCH resource pool and the PSSCH resource pool occupy a same subframe set. A PSCCH and a PSSCH scheduled by the PSCCH can be located on a same subframe. One PSCCH is fixedly mapped to two Physical Resource Blocks (PRBs). The allocation granularity for frequency resources is a sub-channel, and one sub-channel contains successive PRBs, where the number of PRBs is configured by a higher-layer signaling. Resources for one equipment can occupy one or more successive sub-channels. The PSCCH and the PSSCH can occupy successive PRBs. In one or more successive sub-channels occupied by the resources for one equipment, two PRBs having the lowest frequency index are used for bearing the PSCCH, while other PRBs are used for bearing the PSSCH. PRBs for the PSCCH and PRBs for the PSSCH may not be successive. In this case, a starting PRB position of the PSCCH resource pool and a starting PRB position of the PSSCH resource pool can be configured, respectively. Resources are still allocated for the PSSCH resource pool per sub-channel. For one equipment, an index for the occupied PSCCH is equal to an index for a minimum sub-channel of the occupied PSSCH.

For the data transmission of a UE, each packet can be repetitively transmitted for K times; and accordingly, it is necessary to reserve K resources, where K is greater than or equal to 1. In this way, it is avoided that this packet cannot be received by some equipments due to the limitations to a half-duplex operation. The UE can periodically reserve the K resources within a certain reservation interval and can thus transmit this packet multiple times. According to the detection information within one detection window, the UE can select the K resources that can be occupied by the UE and reserve the K resources in C successive cycles. One resource detection method is to obtain a PSSCH scheduled by the PSCCH through decoding PSCCHs of other UEs. In this way, the PSSCH Reference Signal Received Power (PSSCH-RSRP) of the corresponding UE can be measured, and the resource occupancy and/or reservation is thus decided based on the received power and the reservation interval in the PSCCH. Another resource detection method is to decide the resource occupancy and/or reservation on the basis of the Sidelink Received Signal Strength Indicator (S-RSSI). Comprehensively considering the two methods, the equipment can avoid occupying the same resources as other equipments for transmission as far as possible.

Figure 3A:
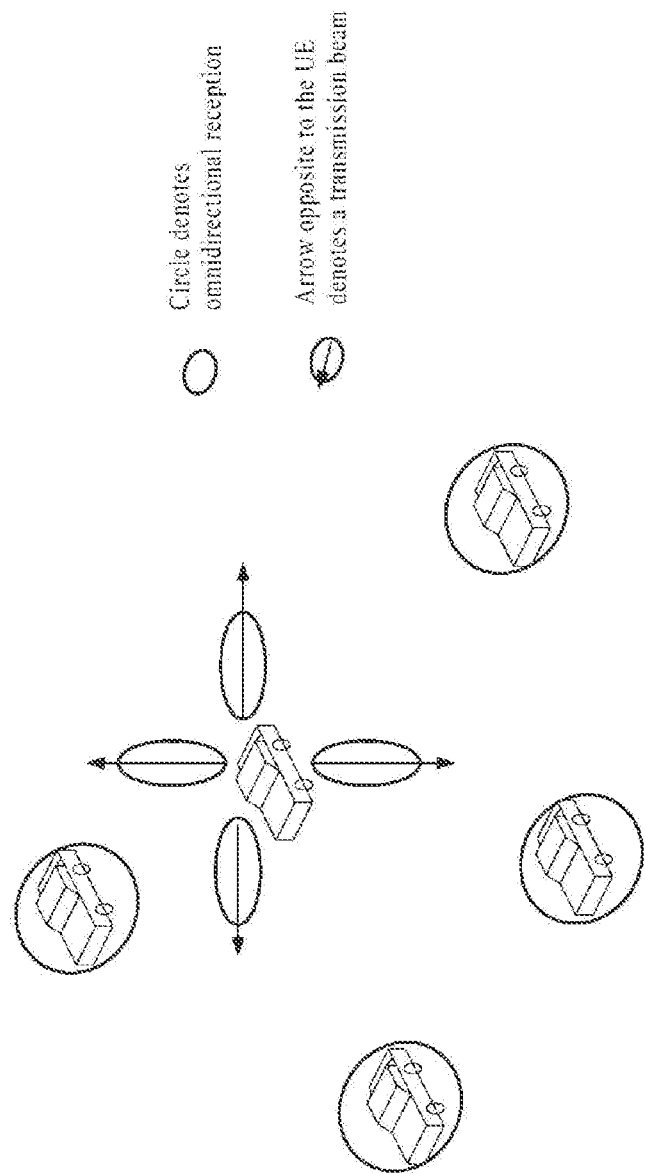
FIG. 3A is a first schematic diagram of transmission and reception by a V2X UE based on beams in the prior art.
Figure 3B:
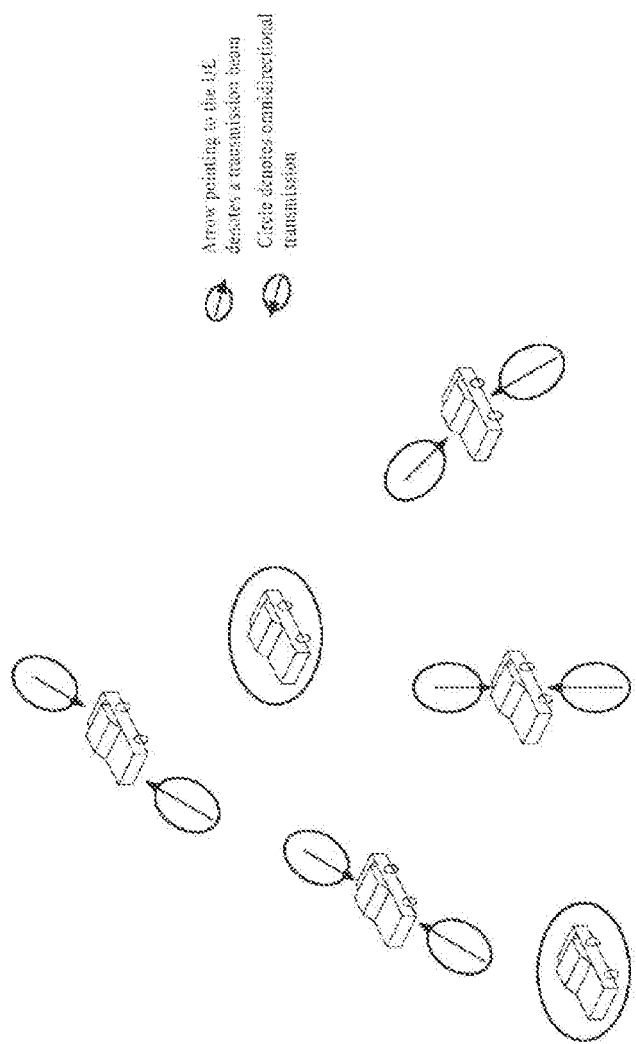
FIG. 3B is a second schematic diagram of transmission and reception by a V2X UE based on beams in the prior art.

The fifth-generation (5G) mobile communication is being standardized by the organization for 3GPP standardization, including the further enhancement of the LTE and a New Radio Access Network Technology (NR). Correspondingly, the V2X performance can be further enhanced in the 5G system. One aspect to be enhanced is the transmission and reception based on beams. For example, when a V2X operation is performed on a high frequency band, the transmission and/or reception range can be increased by beamforming on the transmitter and/or receiver side, so that the interference to a terminal that is not a target receiver is reduced, and the V2X performance is thus improved. A V2X terminal (referred to as a UE hereinafter) can include a vehicle, a pedestrian, a Road Side Unit (RSU) or more. The position of the RSU can be fixed; however, the position of the vehicle and the pedestrian is variable, and the position of the vehicle can change quickly. In a practical system, it is possible that only the transmission is performed based on beams while the reception is still performed by a conventional omnidirectional antenna, as shown in FIG. 3A; it is also possible that only the reception is performed based on beams while the transmission is still performed by a conventional omnidirectional antenna, as shown in FIG. 3B; or, both the transmission and the reception are performed based on beams, as shown in FIG. 3C, and different UEs may have different transmission or reception beam capabilities, for example, different numbers of transmission or reception beams. Therefore, how to perform effective resource allocation for the UE and how to perform transmission and reception based on beams become problems to be urgently solved.

In another aspect, in 3GPP, the direct communication link between the user equipments (UEs) is referred to as sidelink. Similar to the uplink and downlink, a control channel and a data channel exist in the sidelink. The former is called Physical Sidelink Control Channel (abbreviated as PSCCH), and the latter is called Physical Sidelink Shared Channel (abbreviated as PSSCH). The PSCCH is used to indicate the location of the time-frequency resources (hereinafter abbreviated as resources), the modulation and coding scheme adopted by the PSSCH transmission, and the priority of the data carried in the PSSCH. The PSSCH is used to carry data.

The control information in Vehicle to Vehicle/Pedestrian/Infrastructure/Network (V2X for short) communication may be transmitted by the sidelink. In this case, V2X communication includes two transmission modes, i.e., transmission mode 3 (Mode 3) and transmission mode 4 (Mode 4). For Mode 3, the UE (referred to as the V2X UE herein) firstly determines the configuration of the resource pool by receiving the signaling of the base station (abbreviated as NB below). After that, the UE continues to receive the indication of the NB and determines the transmission resources of the PSCCH and PSSCH in the resource pool. The information indicating the transmission resources of the PSCCH and PSSCH is carried by the downlink control channel (PDCCH or EPDCCH). In Mode 4, the UE firstly determines the configuration of the resource pool by receiving signaling or pre-configuration of the NB, then the UE autonomously selects the transmission resources of the PSCCH and PSSCH in the resource pool according to the result of channel detection. If the UE employing Mode 4 has V2X data to be transmitted in the nth subframe (that is, the time when the V2X packet reaches the UE radio access layer no later than nth subframe) and the conditions for resource selection or reselection are satisfied, the UE will view the time-frequency resources in the resource selecting window [n+T1, n+T2] of the current carrier as candidate single subframe resources (the values of T1 and T2 are determined by the UE, but the condition of $T1 \leq 4$, $20 \leq T2 \leq 100$ needs to be satisfied; T2 needs to meet the requirements for the delay of the transmitted data currently), and continues to determine available candidate single subframe resources within the resource selecting window. In the step of determining the available candidate single subframe resources, the UE determines the locations and priorities of the time-frequency resources of the scheduled PSSCH by receiving the PSCCH transmitted by other UEs at first, and continues to detect the demodulated reference channel receiving power of the scheduled PSSCH (PSSCH-RSRP), and excludes the resources whose PSSCH-RSRP is higher than a predetermined threshold (hereinafter referred to as step 2 of the resource selection); subsequently the UE calculates the average receiving energy (S-RSSI) of the remaining resources, and those single subframe resources whose S-RSSI are the lowest X % are the available candidate single subframe resources (hereinafter referred to as step 3 of the resource selection). In the 3 GPP Rel-14 specification, the value of X is 20. It is to be noted that the X % is the ratio of available candidate single subframe resources to all the single subframe resources in the resource selecting window. The UE will randomly select one of the available candidate single subframe resources as a transmission resource.

In the current V2X communication, data transmitted by any UE is received by all UEs within a certain range. Therefore, the transmitted data needs not to be encrypted, and the transmitted signal needs to cover the entire target area. However, another scenario in V2X communication is for automatic platooning. In the auto platooning, multiple cars compose a whole group by virtual links, and the distance between two adjacent cars in the platooning can be kept small, and the composed group can run like a train. In order to maintain the distance between cars in the platooning, UEs in the platooning need to communicate (hereafter referred to as intra-group communications) with the UEs within the platooning in addition to communicating (hereafter referred to as external communications) with the UEs outside of the platooning, roadside units (RSUs), or NBs. Specifically, there is a control UE (CUE) in each automatic platooning. The CUE is responsible for information exchange with the RSUs or the external UEs of the platooning, and forwards the information obtained from the RSUs or the cars outside of the platooning to the UEs within the platooning. A member UE (MUE) other than the CUE in the platooning needs to directly interact with the CUE and other MUEs. For the safety of the automatic platooning, the information exchanged between the UEs within the platooning should be kept as confidential as possible to the UEs outside of the platooning, that is, confidential within the group, and the signal that carries the internal information of the platooning should be transmitted directionally as far as possible to avoid to be leaked out of the platooning, so that the interference with other UEs outside the platooning may be reduced and the resource utilization efficiency may be increased.

Obviously, since the current V2X communication cannot ensure confidential within the group and the directional transmission of physical signals, the requirements of the internal communication cannot be met. However, there are no technical solutions to solve the problem.

In the present disclosure, by providing method and a user equipment for resource allocation, when UEs perform transmission and/or reception based on beams, resource selection is performed more efficiently, and data transmission and reception are performed so that it is ensured that a transmitting UE can cover each desired direction and a receiving UE can perform reception correctly in the desired direction. Accordingly, the collision between UEs is further reduced, and the transmission performance of UEs is improved.

Specifically, the present disclosure provides a resource allocation method, as shown in FIG. 4, including the following steps. The following steps may be performed by a UE.

Step 401: Each configured resource pool and/or each group of resources is sensed to obtain a result of sensing.

Wherein, the result of sensing contains a set of remaining candidate single TU (time unit) resources of each resource pool and/or each group of resources.

In this step, each resource pool is configured by the following three configuration methods.

1) At least two resource pools are configured according to multiple configuration signalings, respectively; resources in the at least two configured resource pools are independent from each other; or, the at least two resource pools satisfy a predefined relationship.

2) One of at least two resource pools is configured according to one configuration signaling, and the other one of the at least two resource pools is determined according to the one resource pool and a predefined relationship.

3) At least one resource pool is configured according to one or more configuration signaling; resources in the at least one configured resource pools satisfy a predefined relationship.

The step of sensing each configured resource pool and/or each group of resources to obtain a result of sensing may include following steps.

Receiving, within a sensing window of a transmission resource pool, Physical Sidelink Control Channels (PSCCHs) transmitted by other User Equipments (UEs), and determining time-frequency resources and priorities for Physical Sidelink Shared Channels (PSSCHs) according to the PSCCHs.

Performing PSSCH-RSRP measurement on the PSSCHs based on the time-frequency resources, and determining, according to the priority of each PSSCH, whether an RSRP measurement value of each PSSCH is higher than a predefined threshold.

If the RSRP measurement value of the PSSCH is higher than the predefined threshold and a corresponding time-frequency resources is located within a resource selection window of the transmission resource pool, excluding the time-frequency resource. If the number of remaining candidate single TU resources expect for the time-frequency resource is less than a predefined threshold value, increasing the predefined threshold, and re-excluding a time-frequency resource until the number of remaining candidate single TU resources is greater than or equal to the predefined threshold value.

The time-frequency resource is excluded according to the following kinds of granularity:

Preferably, the excluded time-frequency resource in each resource pool and/or each group of resources uses the candidate single TU resource, which consists of N TUs and M PRBs and is used for transmitting a same packet, as granularity.

Preferably, the excluded time-frequency resource in each resource pool and/or each group of resources uses a time-frequency resource consisting of M PRBs within one TU as granularity.

Preferably, if the remaining time-frequency resources contain a time-frequency resource for which no candidate single TU resource granularity can be formed, the time-frequency resource is removed.

Step 402: One candidate single TU resource is selected, from the set of remaining candidate single TU resources of each resource pool and/or each group of resources, as a transmission resource.

Wherein, the candidate single TU resource is a time-frequency resource which consists of N TUs and M PRBs and is used for transmitting a same packet, where N>1 and M≥1. A difference in time between the first TU and the last TU among the N TUs does not exceed a predefined time threshold, or there is a predefined time-domain pattern relationship between TUs among the N TUs. In a preferred embodiment, the predefined pattern relationship is that adjacent TUs among the N TUs have a same time interval. However, the predefined pattern relationship is not limited thereto.

The step of selecting, from the set of candidate single TU resources of each resource pool, one candidate single TU resource as a transmission resource may include following steps:

Calculating a S-RSSI of the remaining candidate single TU resources in each transmission resource pool and/or each group of resources.

Selecting a predefined number of candidate single TU resources in an order from the smallest to the largest S-RSSI.

Selecting, from the predefined number of candidate single TU resources, one candidate single TU resource as a transmission resource.

Step 403: A packet to be transmitted which is borne by the transmission resource is transmitted via the transmission resource.

Further, the method provided by the present disclosure may further include step such as, receiving PSCCHs and/or PSSCHs in a reception resource pool, wherein the PSCCHs and/or PSSCHS are borne on N TUs in a candidate single TU resource.

Furthermore, a frequency-domain relationship between TUs among N TUs may be determined in any one of the following situations:

1) The N TUs use same frequency-domain resources, one PSCCH and/or PSSCH is received within any one of the N TUs, and information indicative of the time and/or frequency domain of a PSCCH and/or a PSSCH of at least one another TU carried in the PSCCH is acquired.

2) The N TUs use different frequency-domain resources and the relationship between the frequency-domain resources corresponding to the N TUs is predefined, one PSCCH and/or PSSCH is received within any one of the N TUs, and information indicative of the time and/or frequency domain of a PSCCH and/or a PSSCH of at least one another TU carried in the PSCCH is acquired.

3) The N TUs satisfy a predefined pattern relationship, one PSCCH and/or PSSCH is received within any one of the N TUs, and information indicative of the time and/or frequency domain of a PSCCH and/or a PSSCH of at least one another TU carried in the PSCCH is acquired.

4) The N TUs use different frequency-domain resources, a position of a frequency-domain resource for each of the N TUs is detected, and a position of a PSCCH within each TU is determined according to the position of the frequency-domain resource.

5) The N TUs do not satisfy the predefined pattern relationship, a PSCCH and/or a PSSCH within at least one of the N TUs is received, and information indicative of the time and/or frequency domain of a PSCCH and/or a PSSCH of at least one another TU carried in the PSCCH is acquired.

Furthermore, in order to keep the stability of the transmitted packet during the transmission of the packet, at least one of the following processes can be performed:

Determining transmission parameters in each resource pool according to a Channel Busy Ratio (CBR) of TUs in each resource pool and/or each group of resources.

Calculating an Occupancy Ratio (CR) of resources in each resource pool and/or each group of resources and/or the maximum value of the CR of resources, respectively.

Determining reserved resources for transmitting the packet in each resource pool and/or each group of resources.

Determining, according to the CBR and priority of each resource pool and/or each group of resources, whether to discard the reserved resources.

The resource allocation method provided by the present disclosure may be particularly applied to the transmission based on beams, during the transmission and reception of the borne packet to be transmitted via the transmission resource.

For a group of UEs, for example, for UEs within a same region, when beams are transmitted within a transmission resource pool and/or beams are received within a reception resource pool and/or each group of resources.

Preferably for this group of UEs, the direction of transmission beams within each corresponding transmission resource pool and/or each group of resources complies with a same rule.

Preferably for this group of UEs, the direction of reception beams within each corresponding reception resource pool and/or each group of resources complies with a same rule.

Wherein, the transmitting direction and/or receiving direction during the transmission based on beams can be determined according to a service type. Similarly, the configuration of a resource pool, the determination of a candidate single TU resource, and the selection of a transmission resource on the basis of sensing can be determined according to the service type.

The step division in the embodiment of the present disclosure is merely for describing one embodiment of the present disclosure, and the step division of the resource allocation method can be not limited thereto.

For the processing of the transmission based on beams, the transmission based on beams, the reception based on beams, and the transmission and reception based on beams will be correspondingly described below by specific practices. Wherein, each UE has a transmission beam capability and/or a reception beam capability. In the following description of the present disclosure, the term "a transmitting UE" merely indicates the UE performing current processing by using the transmission beam capability. Similarly, the term "a receiving UE" merely indicates the UE performing current processing by using the reception beam capability.

When a UE transmits signals by transmission beams, for the transmission of a service in the form of broadcast, multicast or for the unicast transmission where the position of a receiving UE is uncertain, a transmitting UE needs to repetitively transmit one packet for N times in multiple directions by sweeping. As described above, in the existing LTE system, to solve the half-duplex problem, each packet can be repetitively transmitted for K times. In the present disclosure, for the data transmission between UEs, each packet can be repetitively transmitted for $K*N_1$ times. Correspondingly, the transmitting UE needs to reserve $K*N_1$ resources, where K is greater than or equal to 1 and $N_1$ is greater than or equal to 1. The UE can periodically reserve the $K*N_1$ resources according to a certain reservation interval, and thus can transmit the packet for multiple times. According to the detection information within one detection window, the UE can select $K*N_1$ resources that can be occupied by the UE, and reserve the $K*N_1$ resources in C successive cycles.

When UEs receives signals by reception beams, and when the direction of arrival of the received signal is uncertain, for example, when the direction of the transmitting UE is uncertain or the direction of transmission beams of the transmitting UE is uncertain, the receiving UE needs to attempt to receive data in multiple directions. Correspondingly, in order to ensure the correct reception of the receiving UE, the transmitting UE needs to repetitively transmit data for $N_2$ times in a same transmission direction. In this way, each packet can be repetitively transmitted for $K*N_2$ times.

When both the transmission and reception between UEs are based on beams, and when the direction of a UE that receives signals is uncertain, the transmitting UE needs to repetitively transmit data for $N_2$ times in a same transmission direction, and to transmit in multiple directions for $N_1$ times. In this way, each packet can be repetitively transmitted for $K*N_1*N_2$ times.

In a real system, each UE may have different transmission beam capabilities and reception beam capabilities. For example, some UEs can transmit different beams within different TUs by time division, where the total number of beams is 4, and some UEs can form different reception beams within different TUs by time division, where the total number of reception beams is 8. A UE can report its own beam capability to a control node, or inform a potential receiving UE of its own beam capability.

Correspondingly, in a specific implementation, the numbers $N_1$ and $N_2$ of repetitive transmissions can be determined by various methods. For example, for a service transmitted by broadcasting or multicasting, $N_2$ can be determined according to the maximum value of reception beams of each potential receiving UE. For a service transmitted by unicasting, $N_2$ can be determined according to the number of reception beams of the unique receiving UE. For another example, in order to keep the consistency of transmitting UEs in the whole network, the number of repetitive transmissions can be set to be identical. However, within the number of repetitive transmissions, the number of transmissions performed by a same transmission beam can be identical or different for different UEs. For example, when the number of repetitive transmissions is set as 4, for a UE having only two transmission beam capabilities, one packet can be transmitted for two times on each beam and be successively transmitted on two beams, for a UE having four transmission beam capabilities, one packet can be transmitted for one time on each beam and be successively transmitted on four beams, for a UE having eight transmission beam capabilities, four beam directions can be selected first, and one packet is transmitted for one time on each beam and be successively transmitted on four beams, or more.

For the numbers $N_1$ and $N_2$ of repetitive transmissions, it is possible that a central control node for V2X communication (e.g., a base station in a cellular network) or another V2X central control node configures $N_1$ and $N_2$ for a UE within its coverage scope according to the actual condition. It is also possible that the values of $N_1$ and $N_2$ are predefined by the system. For example, for a UE beyond the coverage of the central control node, it is necessary to use the predefined value. It is also possible that $N_1$ and $N_2$ are determined by the transmitting UE and then directly or indirectly informed to the receiving UE.

In the present disclosure, the design related to $N_1$, $N_2$ or $N_1*N_2$ repetitive transmissions will be mainly described. Unless otherwise specified, it is considered that the processing of K repetitive transmissions is the same as that in the prior art; or, it can be understood that, each of the K repetitive transmissions corresponds to N (e.g., $N_1$, $N_2$ or $N_1*N_2$) transmissions in this embodiment, and the relationship between the K transmissions can be determined by the prior art and will not be repeated here. For the convenience of description, in this embodiment, the description will be given at K=1. However, it does not mean that K can be greater than 1.

In the present disclosure, the following four specific embodiments will be provided to describe the process of the method for allocating resources for a V2X UE for transmission and/or reception based on beams according to the present disclosure. A method for allocating a resource pool, a sensing method, a method for transmitting/receiving V2X signals based on beams, and a congestion control method are included.

Embodiment 1

In a V2X system, if it is necessary to provide a service for a receiving UE based on beams or a transmitting UE performs transmission based on beams, the transmitting UE needs to repetitively transmit one packet for N times (it is also possible that K*N times of repetitive transmission are performed, but for the convenience of description, it is assumed that K=1), for example, N=$N_1$, $N_2$ or $N_1*N_2$, the resources for transmitting data can be configured or preconfigured.

The configuration/preconfiguration of a transmission resource pool can be implemented in the following ways.

(1) In a set ($t_0^{SL}$, $t_1^{SL}$, ..., $t_{Tmax}^{SL}$), $N_p$ resource pools are defined by a bitmap ($b_{0,1}$, $b_{1,i}$ $b_{Lbitmap-1,i}$) having a length of $L_{bitmap,i}$. When $b_{k',i}=1$ and k'=kmod$L_{bitmap,i}$, a TU $t_k^{SL}$ belongs to the resource pool #i. Wherein, the TU can be a subframe, a slot, a mini slot, a symbol, multiple aggregated slots/mini slots, or more. One slot contains a particular number of OFDM symbols, and one mini slot is shorter than the slot and can contain one or more OFDM symbols. For example, in the LTE V2X system, the TU is a subframe containing 14 OFDM symbols.

Preferably, the configurations of the $N_p$ resource pools are independent from each other. For example, there is no limitation to the correspondence between the positions of TUs of the $N_p$ resource pools. The length of each resource pool can be different or identical.

Preferably, the configurations of the $N_p$ resource pools are associated with each other. For example, one resource pool is defined, and other Np−1 resource pools can be determined uniquely according to the predefined relationship. The length of each resource pool is identical.

Figure 5:
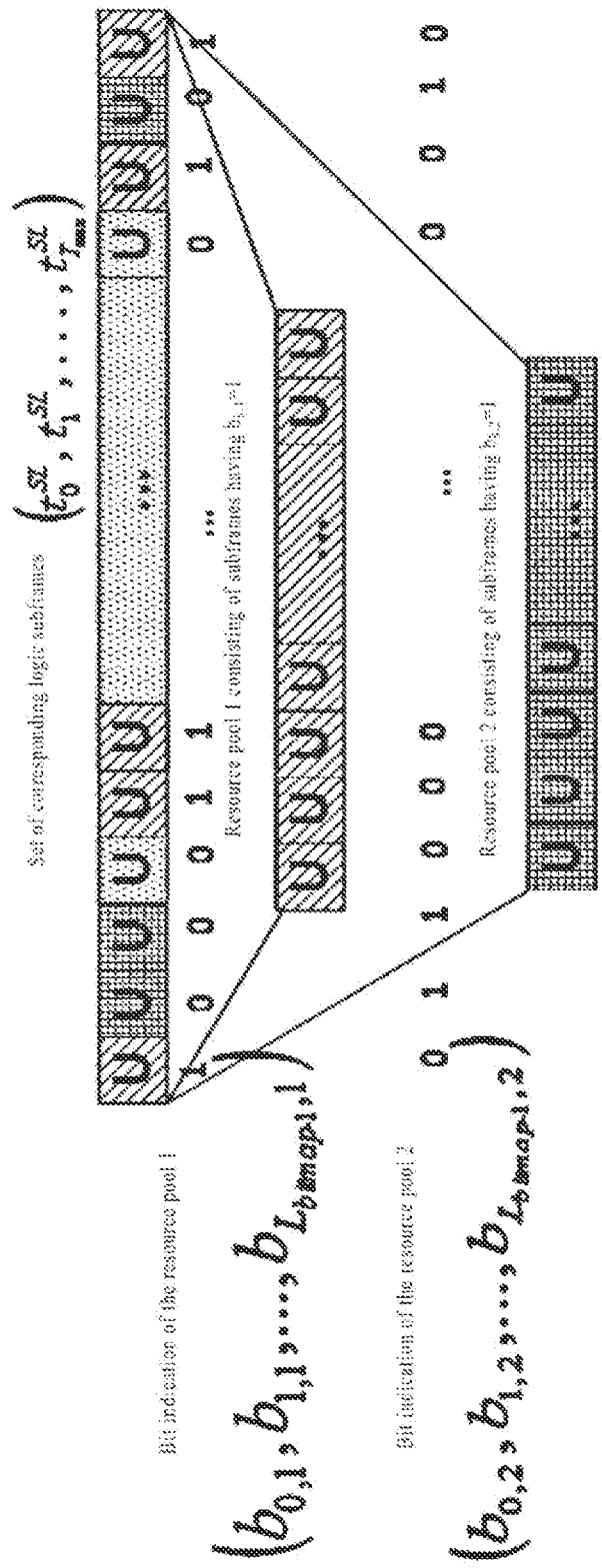
FIG. 5 is a first schematic diagram of configuring a resource pool for a V2X UE based on beams according to an embodiment of the present disclosure.

The configurations of the $N_p$ resource pools are indicated by multiple signalings. For example, each signaling independently indicates the position of one resource pool. There is no constraint relationship between the resource pools indicated by the $N_p$ signalings. As shown in FIG. 5, $N_p$=2. For another example, each signaling independently indicates the position of one resource pool, but the resource pools indicated by the N signalings need to satisfy a predefined relationship, for example, being adjacent.

(2) The configurations of the $N_p$ resource pools can be indicated by one signaling. The Np resource pools can share a same group of bit indications, and the $N_p$ resource pools are further distinguished by other methods or parameters.

Preferably, a first resource pool is defined by a bitmap ($b_0$, $b_1$, ..., $b_{Lbitmap-1}$) having a length of $L_{bitmap}$, and the offset of second, third, ... ($N_p$)$^{th}$ resource pools with respect to the first resource pool is indicated or predefined. For example, for the first resource pool, when $b_k=1$ and k'=kmod$L_{bitmap}$, the TU $t_k^{SL}$ belongs to the first resource pool. Thus, in the set ($t_0^{SL}$, $t_1^{SL}$, ..., $t_{Tmax}^{SL}$), the X$^{th}$ TU offsetting with respect to this TU is a TU of the second resource pool; the X$^{th}$ TU offsetting with respect to the TU of the second resource pool is a TU of the third resource pool; and so forth. In a particular case, X=1, that is, the TUs corresponding to the resource pools are adjacent logic TUs.

Figure 6:
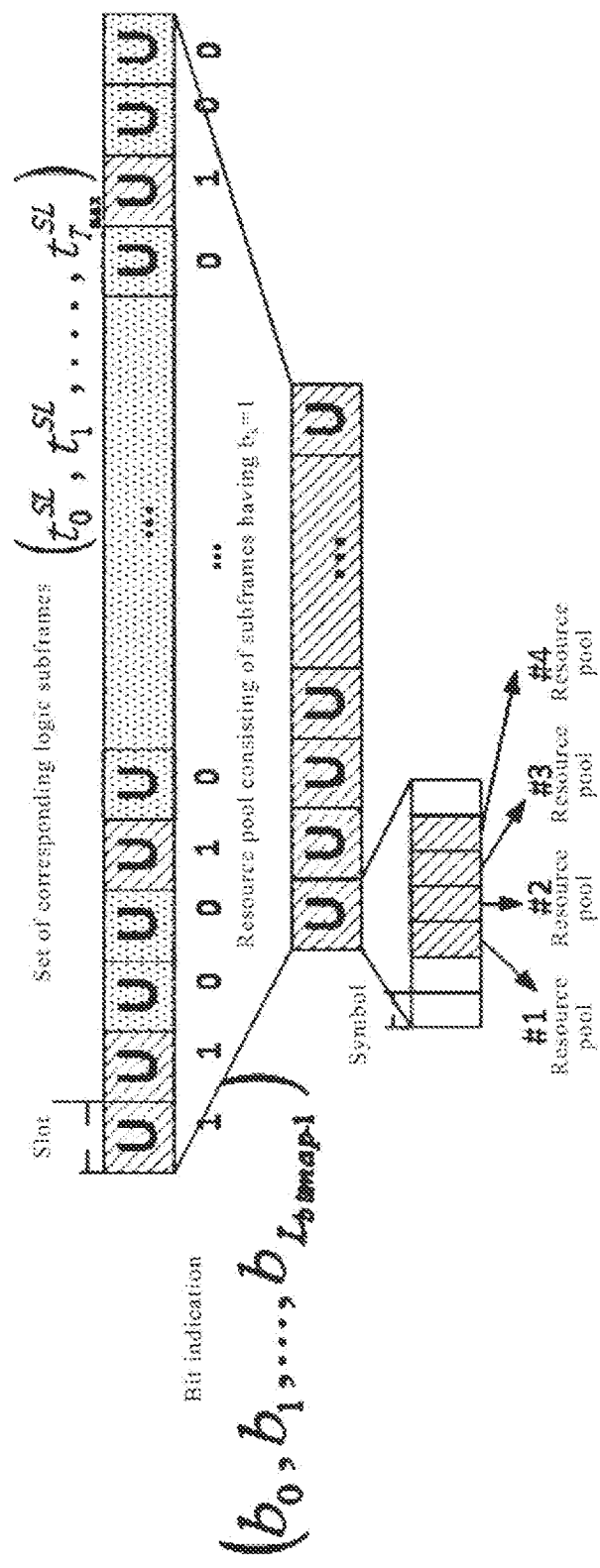
FIG. 6 is a second schematic diagram of configuring a resource pool for a V2X UE based on beams according to an embodiment of the present disclosure.

Preferably, in a set ($t_0^{SL}$, $t_1^{SL}$, ..., $t_{Tmax}^{SL}$), $N_p$ resource pools are defined by a bitmap ($b_0$, $b_1$, ..., $b_{Lbitmap-1}$) having a length of $L_{bitmap}$. When $b_k=1$ and k'=kmod$L_{bitmap}$, the TU $t_k^{SL}$ belongs to the resource pool #i. Here, the TU corresponds to time resources of the $N_p$ resource pools. For example, when $N_p$=4, the time granularity corresponding to the TU $t_k^{SL}$ is a slot, and it is assumed that the slot has a length of 7 OFDM symbols. In this way, $N_p$ time resources contained in this TU are determined according to a predefined rule, and the $N_p$ time resources correspond to $N_p$ resource pools. For example, as shown in FIG. 6, if it is predefined that the first symbol, the second symbol and the last symbol among the seven symbols are vacated, the third symbol, the fourth symbol, the fifth symbol and the sixth symbol are TUs of the first resource pool, the second resource pool, the third resource pool and the fourth resource pool, respectively. Or, the position information of the $N_p$ time sources in the seven symbols is further configured. For example, 7 bits are used to indicate that which four symbols correspond to TUs of the first resource pool, the second resource pool, the third resource pool and the fourth resource pool, respectively.

(3) On the set ($t_0^{SL}$, $t_1^{SL}$, ..., $t_{Tmax}^{SL}$), $N_q$ resource pools are defined by mapping $N_q$ $L_{bitmap,i}$-length bits to ($b_{0,i}$, $b_{1,i}$, ..., $b_{Lbitmap-1,i}$). When $b_{k'i}=1$ and k'=kmod$L_{bitmap,i}$, the TU $t_k^{SL}$ belongs to the #i resource pool. Wherein, the TU may refer to a subframe, a slot, a mini-slot, a symbol, or a cascade of multiple slots/mini slots, and the like. One slot includes a specific number of OFDM symbols, and a mini-slot is shorter than a slot, and may contain one or more OFDM symbols. For example, a TU in an LTE V2X system is a subframe containing 14 OFDM symbols.

In a resource pool, $N_p$ groups of resources are allocated according to a predefined pattern or according to a configured pattern.

Preferably, for a resource pool, the first group of resources in the resource pool is defined by mapping $L_{bitmap}$-length bits to ($b_{0,1}$, $b_{1,i}$, ..., $b_{Lbitmap-1,i}$), and the offset of second, third, ... ($N_p$)$^{th}$ groups of resources with respect to the first group of resources is indicated or predefined. For example, for the first group of resources, when $b_k=1$ and k'=kmod$L_{bitmap}$ the TU $t_k^{SL}$ belongs to the first group of resources, then, within the set ($t_0^{SL}$, $t_1^{SL}$, ..., $t_{Tmax}^{SL}$), the TU which is offset by X TUs relative to the time unit $t_k^{SL}$ is the TU of the second group of resources, and the TU which is offset by X TUs relative to the second TU is the TU of the third group of resources, and so on. As a specific example, X=1, that is, within a resource pool, the TUs corresponding to each group of resources are logical TU immediately adjacent.

Preferably, on the set ($t_0^{SL}$, $t_1$SL, $t_{Tmax}^{SL}$), $N_p$ groups of resources within one resource pools are defined by mapping $L_{bitmap}$-length bits to ($b_0$, $b_1$, ..., $b_{Lbitmap-1}$). When $b_k=1$ and k'=kmod$L_{bitmap}$, the TU $t_k^{SL}$ belongs to this resource pool. One TU here corresponds to $N_p$ time resources in the resource pool. For example, $N_p$=4, and the time granularity corresponding to the TU $t_k^{SL}$ is a slot, and it is assumed that the slot has a length of 7 OFDM symbols. Then, according to predefined rules, $N_p$ time resources included in the TU are determined, which correspond to $N_p$ group of resources. For example, as shown in FIG. 6, the first, second, and last symbols of the seven symbols are vacated in a predefined way, then the third, the fourth, the fifth, and the sixth symbols are one TU of the first, the second, the third and the fourth groups of resources, respectively. Alternatively, the position information of the $N_p$ time resources among the 7 symbols is further configured, for example, it is indicated by 7 bits that which 4 symbols correspond to the TUs of the first, the second, the third and the fourth groups of resources, respectively.

In the above method, a UE for performing reception based on beams is served, or a transmitting UE performs transmission based on beams. $N_p$ transmission resource pools may be configured for the transmitting UE or $N_p$ groups of transmission resources may be configured in the same resource pool, and/or $N_p$ reception resource pools may be configured for a receiving UE or $N_p$ groups of reception resources may be configured in the same resource pool.

Preferably, the configured reception resources are in one-to-one correspondence with the transmission resource pools and/or the transmission resource group, and the number of the configured reception resource pools and/or the reception resource groups is equal to the number of the transmission resource pools and/or the transmission resource groups.

Preferably, the transmission resource pools and/or resource groups and the reception resource pools and/or resource groups are configured independently, and can be unequal in number. For example, a base station configures two transmission resource pools for a transmitting UE, and the two transmission resource pools have identical frequency-domain resources and different time resources, and, the base station can configure one reception resource pool for a receiving UE, and this reception resource pool corresponds to a union set of the two transmission resource pools.

Preferably, the signaling design for configuring the reception resource pools and/or resource groups can refer to the signaling design for configuring the transmission resource pools and/or resource groups in this embodiment and will not be repeated here.

Preferably, whether multiple resource pools and/or resource groups are configured independently or jointly and how to configure resource pools and/or resource groups are related to the delay of a UE to transmit a packet, the flexibility of a UE to transmit a packet and the like.

Preferably, if a UE is capable of transmitting by beams, and if multiple transmission resource pools and/or resource groups are configured, the UE can transmit by different transmission beams in different transmission resource pools and/or resource groups. In a same transmission resource pool and/or resource groups, data is transmitted by a same transmission beam.

Preferably, if a UE is capable of receiving by beams, and if multiple reception resource pools and/or resource groups are configured, the UE can receive by different reception beams in different reception resource pools and/or resource groups. In a same reception resource pool and/or resource groups, data is received by using a same reception beam.

Preferably, to allow UEs within a certain scope to have consistent behaviors, $N_p$ identical resource pools and/or resource groups can be configured for a group of UEs, for example, UEs within a same region.

Preferably, for UEs within a certain scope, within the $N_p$ corresponding transmission resource pools and/or resource groups, the direction of beams which can be transmitted complies with a same rule. For example, starting from the $i^{th}$ TU of one resource pool, all UEs transmit a same packet successively on the $i^{th}$ TU of the second resource pool, the $i^{th}$ TU of the third resource pool, . . . the $i^{th}$ TU of the $(N_p)^{th}$ group of resources in the east, south, west and north, respectively.

Preferably, for UEs within a certain scope, within the N corresponding reception resource pools and/or resource groups, the direction of beams for reception follows a same rule. For example, starting from the $i^{th}$ TU of the first group of resources within one resource pool, all UEs receive a same packet successively on the $i^{th}$ TU of the second resource pool, the $i^{th}$ TU of the third resource pool, . . . the $i^{th}$ TU of the $(N_p)^{th}$ group of resources in the east, south, west and north, respectively.

Preferably, within the $N_p$ corresponding transmission resource pools and/or resource groups, the rule for the direction of beams transmitted by each UE can be different. This is particularly applied to the case where the UEs have different transmission beam capabilities. For example, one UE can transmit a same packet by using beams in $N_p$ directions within the $i^{th}$ TUs of the $N_p$ resource pools, and another UE can transmit a same packet by using beams in $N_p/2$ directions within the $i^{th}$ TUs of the $N_p$ resource pools, i.e., transmitting the same packet for two times in a same direction. For a UE for omni-directional transmission, the same packet is omni-directionally transmitted within $(N_p)^t$ TUs of the $N_p$ resource pools.

Preferably, within the $N_p$ corresponding reception resource pools and/or resource groups, the rule for the direction of beams received by each receiving UE can be different. This is particularly applied to the case where the receiving UEs have different reception beam capabilities. For example, one receiving UE can receive a same packet by using beams in $N_p$ directions within the $i^{th}$ TUs of the $N_p$ resource pools, and another UE can receive a same packet by using beams in $N_p/2$ directions within the $i^{th}$ TUs of the $N_p$ resource pools, i.e., receiving the same packet for two times in a same direction. For a UE for omni-directional reception, the same packet is omni-directionally received within N TUs of the $N_p$ resource pools.

For a UE having a central control node, for example, within the coverage scope of a base station in a cellular network or within the coverage scope of a central control node in a V2X network, the resource pools and/or resource groups are configured by the central node or predefined by the standard. Beyond the coverage of the central control node, the resource pools and/or resource groups are predefined by the standard, or conveyed by a UE within the coverage of the central control node, or determined by the transmitting UE and then informed to the receiving UE in the predefined form.

The $N_p$ resource pools can be not overlapped, partially overlapped or completely overlapped with other V2X resource pools.

In different stages of the V2X communication, a base station can configure different $N_{pi}$ resource pools and/or resource groups for a UE. For example, during the handover or RRC connection establishment, a set of resource pools containing $N_{p1}$ resource pools is used; while after the RRC connection establishment, another set of resource pools containing $N_{p2}$ resource pools is used. Wherein, the $N_{pi}$ resource pools and/or $N_{p2}$ resource pools can be determined by the method in this embodiment, respectively. $N_{p1}=N_{p2}$, or $N_{p1}$ is not equal to $N_{p2}$. The operations to each set of resource pools are independent, and the operation of selecting a resource from each resource pool is also independent. Other embodiments of the present disclosure are also applicable to each set of resource pools Preferably, the PSSCH and PSCCH share a same transmission and/or reception resource pool and/or a resource group.

Preferably, transmission and/or reception resource pools and/or resource groups are independently configured for the PSSCH and PSCCH. For example, the method defined in Embodiment 1 is merely used for determining resource pools for the PSCCH, and the resource pools for the PSSCH can be determined by the prior art.

Embodiment 2

After the resource pools and/or resource groups are determined, within a transmission resource pool, a transmitting UE senses resources in the transmission resource pool, and then selects a resource for practical transmission based on a result of sensing. In this way, the collision between different UEs can be well avoided or reduced. In a V2X system of LTE, a UE selects a transmission resource by the following steps (referring to the section 14.1.1.6 in TS 36.213).

Step 1: A V2X UE determines, within a sensing window, the position and priority of a time-frequency resource of the scheduled PSSCH by receiving a PSCCH transmitted by another UE.

Another UE can be a UE of the same type or a UE of the different type.

Figure 7:
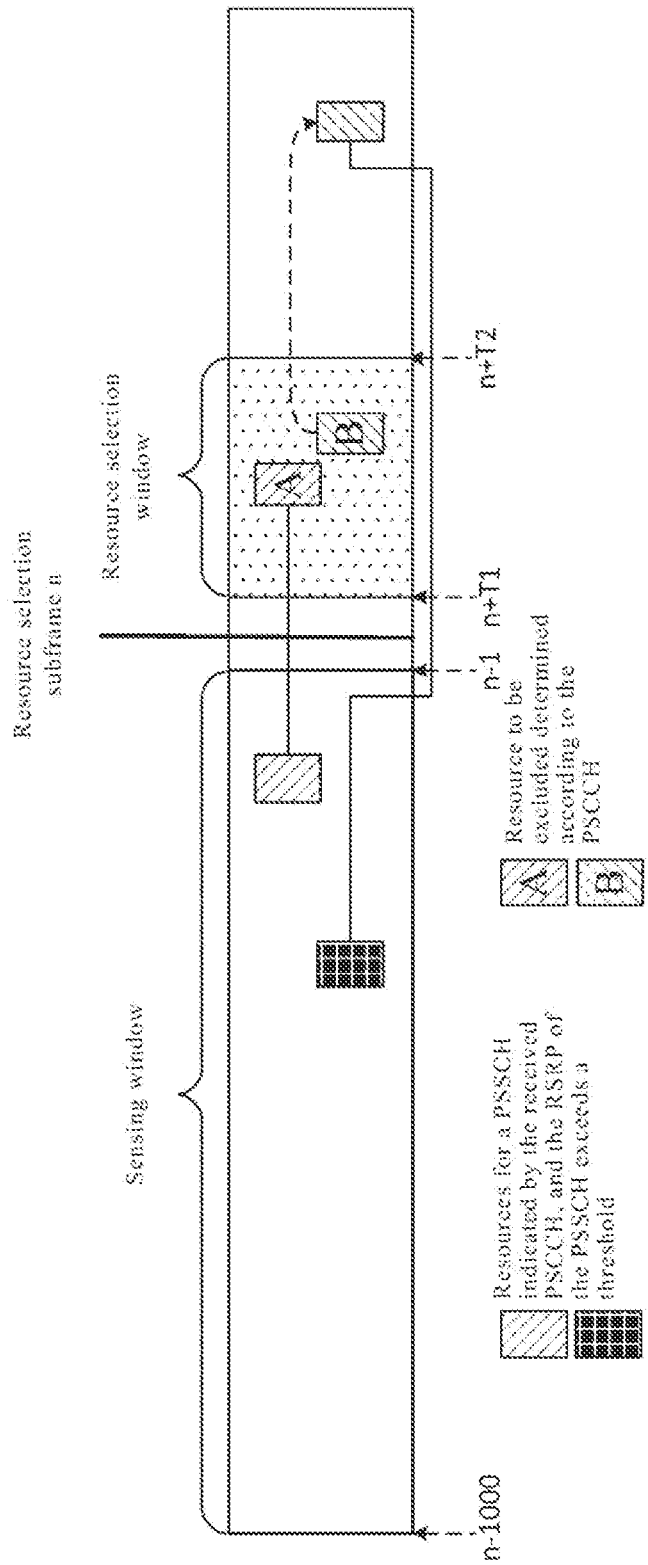
FIG. 7 is a first schematic diagram of a sensing process by a V2X UE based on beams according to an embodiment of the present disclosure.

Step 2: The V2X UE detects demodulation reference signal received power (referred to as PSSCH-RSRP measurement) of the scheduled PSSCH, and excludes resources having a PSSCH-RSRP greater than a specific threshold within a resource selection window. As shown in FIG. 7, RSRP measurement is performed on a PSSCH within the sensing window. If the RSRP is greater than a specific threshold, resources that, corresponding to this PSSCH, may appear within the resource selection window will be excluded. For example, if the proportion of the remaining resources in the total resources within the resource selection window is less than 20%, the specific threshold is increased by 3 dB, and this step will be executed again until the proportion of the remaining resources is not less than 20%.

Figure 8:
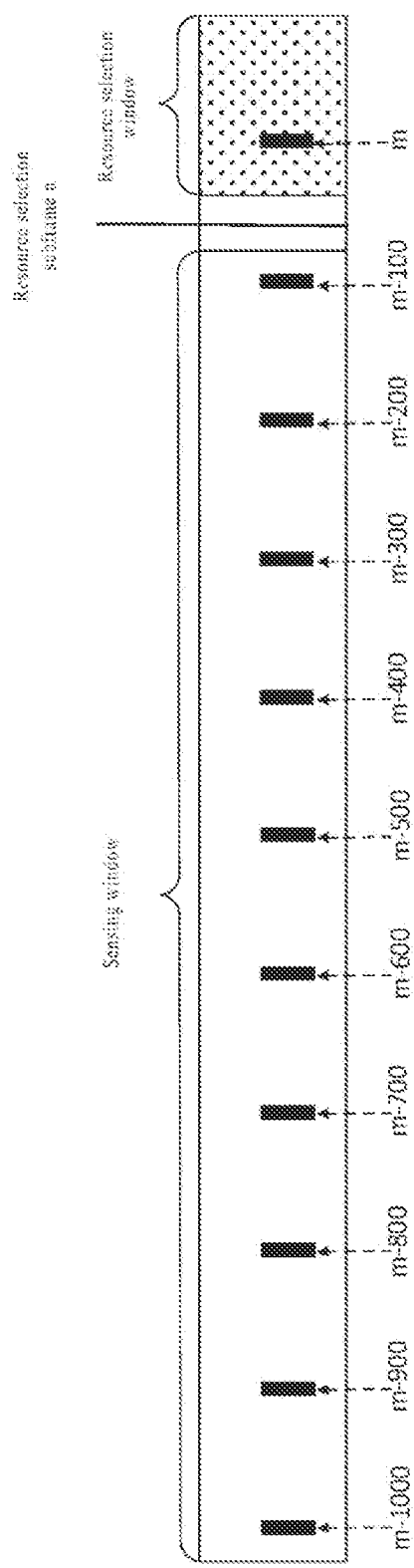
FIG. 8 is a second schematic diagram of a sensing process by a V2X UE based on beams according to an embodiment of the present disclosure.

Step 3: The V2X UE calculates the Sidelink Received Signal Strength Indicator (S-RSSI) of the remaining resources within the resource selection window, and randomly selects, from part of resources having the lowest S-RSSI, a resource as a transmission resource. As shown in FIG. 8, in an order from the smallest to the largest S-RSSI, resources are successively selected from the remaining resources until the proportion of all the selected resources in the total resources within the resource selection window is not less than 20%. Subsequently, a resource is randomly selected from the selected resources as the transmission resource.

When a UE transmits signals by transmission beams or a UE receives signals by reception beams, simply reusing the above steps cannot ensure that the collision between UEs in each direction can be well avoided. Moreover, for a UE for reception based on beams, this problem has to be taken into consideration during the selection of a transmission resource by the transmitting UE. In order to solve this problem, the UE can perform a sensing operation by at least one of the following methods.

For the convenience of description, a resource used for transmitting a same packet among $N_p$ ($N_p=1$ or $N_p=N$) resource pools and/or resource groups is called a "candidate single time unit resource" (its concept corresponds to the concept of an existing single-subframe resource in the LTE) Si for the $i^{th}$ packet. The candidate single TU resource Si contains N TUs in the time-domain dimension and contains M PRBs in the frequency-domain dimension. That is, there are total M*N PRBs. For example, the time-domain dimension of the candidate single TU resource Si is a slot, and the N TUs correspond to one OFDM symbol or one mini slot, respectively. Or, the candidate single TU resource Si is multiple slots, and the N TUs correspond to one slot, respectively. For example, in the frequency-domain dimension of the candidate single TU resource Si, M PRBs of the N TUs are required to satisfy a predefined relationship (for example, being identical) or a predefined pattern relationship, or in the frequency-domain dimension of the candidate single TU resource Si, the relationship between M PRBs of the N TUs is not limited.

Way 1: A UE performs steps 1 to 3 within multiple ($N_p>1$) transmission resource pools and/or resource groups. In the N selected TUs, M PRBs forms a candidate single TU resource. However, in the time dimension, the following condition must be satisfied: a difference in time from the first TUs to the last TUs among the N TUs does not exceed a predefined time threshold in order to satisfy the delay requirements for a V2X service.

Preferably, the M PRBs of the N TUs need to satisfy a predefined relationship, for example, the N TUs occupy M identical PRBs, or the relationship will not be limited.

If a sufficient number of such candidate single TU resources cannot be selected in the step 2 or step 3, the requirement needs to be loosened. For example, the RSRP threshold will be increased in the step 2 in order to satisfy the requirement. In a specific implementation, in the step 2, it may not be limited that the number of reserved TUs in the $N_p$ resource pools is identical, and the delay will not be limited; however, during the random selection of a transmission resource in the step 3, it is necessary to limit the TUs which can form a candidate single TU resource, and M PRBs of N TUs are selected so that a difference in time from the first resource to the last resource in the N TUs does not exceed a predefined time threshold. Or, during the reservation of resources in the step 2, resources are reserved by using a candidate single TU resource having a delay limitation as granularity. For example, within the resource selection window, at least one set of TUs having resources of M PRBs not exceeding the RSRP threshold is #1, #2, #3, #4, #5, #10, #15, #16, #21, #26, #27, #32, #51, #52 and #53. It is assumed that N=4, and the maximum delay cannot exceed 20 ms. Then, TUs #1, #2, #3, #4, #5, #10, #15, #16, #21, #26, #27 and #32 can be reserved, and the step 3 will be executed; however, TUs #51, #52 and #53 cannot be reserved, since the three TUs cannot form one candidate single TU resource with any other TU, the difference in time is less than 20 ms.

If only one resource pool and/or a resource group is defined, that is, $N_p=1$, sensing is performed within this resource pool to select N TUs and M PRBs to form a candidate single TU resource. The N selected TUs must satisfy the condition that the difference in time from the start time to the end time does not exceed the predefined time threshold so that the delay requirement for a V2X service is satisfied. Moreover, the N selected TUs are not located within a same TU in order to support the reception by the UE which is capable of forming only a single receiving beam in one TU or the transmission by the UE which is capable of forming only a single transmission beam in a TU. Preferably, the M PRBs in the N TUs need to satisfy a predefined relationship. For example, the N TUs occupy M identical PRBs, or the relationship will not be limited.

For example, considering that the transmitting UE supports multiple transmission beams but the receiving UE does not support multiple reception beams, or without optimizing reception beams of a UE, the base station configures N transmission resource pools and/or resource groups for the transmitting UE, where N is determined according to the number $N_1$ of transmission beams of the transmitting UE (where $N \geq N_1$). In this case, the UE performs a sensing operation within the N transmission resource pools and/or resource groups to select N resources (candidate single TU resources having total N*M PRBs) for transmission.

For example, considering that the transmitting UE supports multiple transmission beams and the receiving UE supports multiple reception beams, the base station configures N transmission resource pools and/or resource groups for the transmitting UE, where N is determined according to the number $N_1$ of transmission beams of the transmitting UE and the assumption of potential reception beams of the receiving UE by the base station (where $N \geq N_1 * N_2$). In this case, the UE performs a sensing operation within the N transmission resource pools and/or resource groups to select N resources (candidate single TU resources having total N*M PRBs) for transmission.

Way 2: Within multiple ($N_p > 1$) transmission resource pools and/or resource groups, the transmitting UE performs the steps 1 to 3 on $N_p$ resource pools and/or resource groups according to the predefined pattern relationship. The predefined pattern relationship is used for defining the same packet, the position of time resources transmitted within the $N_p$ resource pools and/or resource groups, or the position of time-domain and frequency-domain resources. For example, N TUs of a group of resources Si are N TUs at an interval of X within the resource pools (when X=1, it is indicated that the TUs are adjacent); however, the starting point of this group of resources Si will not be limited. Or, for example, N TUs of a group of resources Si are N TUs at an interval X within the resource pools, and the starting point (e.g., a TU of the first resource pool) of this group of resources Si satisfies a particular requirement, for example, being a multiple of N, or satisfying the condition that it is a multiple of N and with a predefined offset. The starting point is a logic number or a physical number of the TU.

Preferably, there is no constraint relationship between PRBs occupied in the N TUs in this group of PRBs. If it is assumed that each TU can be divided into 100 groups of PRBs, M=10 PRBs are contained in each group of PRBs. In this case, each candidate single TU resource is 10*N PRBs, and corresponds to resources jointly formed by the (ki)$^{th}$ group of 10 PRBs in all i$^{th}$ TUs among the N TUs, where i=1, 2, ... N and ki=1, 2, ... 100. It is not hard to know that, for a group of N TUs, 10N candidate single TU resources can be defined.

Preferably, there is a constraint relationship between PRBs occupied in N TUs in the group of PRBs. For example, identical PRBs are occupied in the N TUs. If it is assumed that each TU can be divided into 100 groups of PRBs, 10 PRBs are contained in each group of PRBs. In this case, each candidate single TU resource is 10*N PRBs, and corresponds to the i$^{th}$ group of 10 PRBs in the N TUs.

Figure 9:
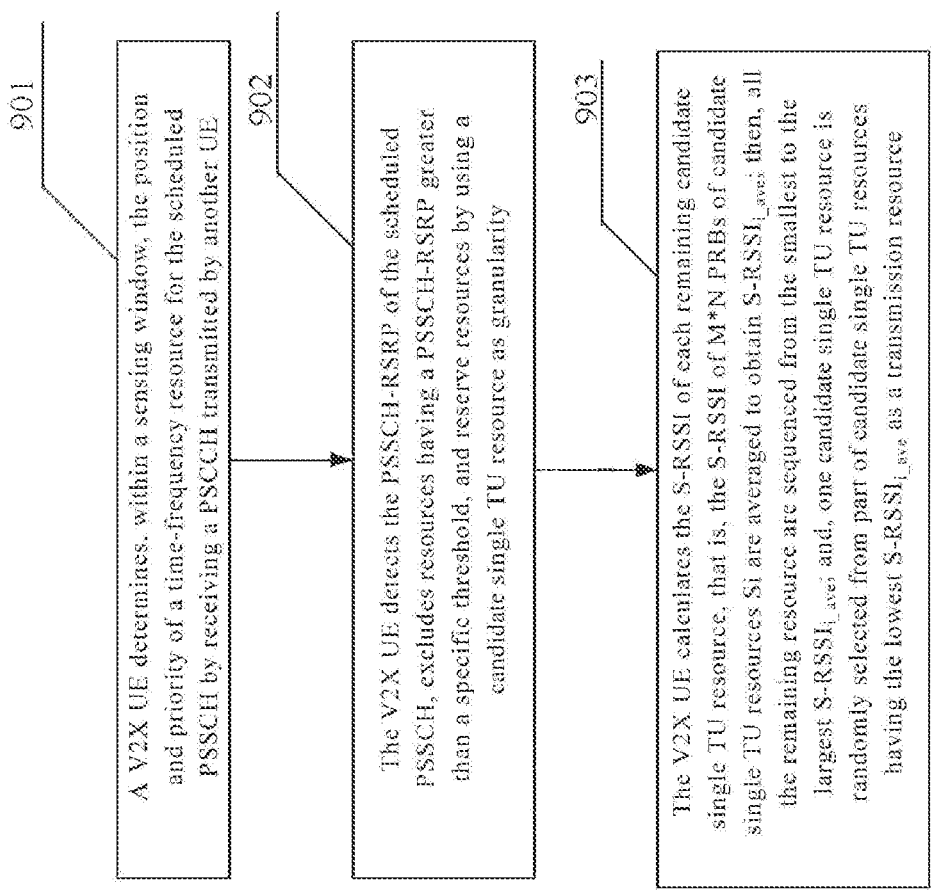
FIG. 9 is a schematic flowchart of resource selection according to an embodiment of the present disclosure.

As shown in FIG. 9, resource selection is performed by the following three steps.

*195Step 901: A V2X UE determines, within a sensing window, the position and priority of a time-frequency resource for the scheduled PSSCH by receiving a PSCCH transmitted by another UE.

Another UE can be a UE of the same type or a UE of the different type.

Step 902: The V2X UE detects the PSSCH-RSRP of the scheduled PSSCH, excludes resources having a PSSCH-RSRP greater than a specific threshold within a resource selection window, and reserve resources using a candidate single TU resource as granularity. For example, the proportion of the remaining candidate single TU resources in the total candidate single TU resources within the resource selection window is less than a predefined threshold, the specific threshold is increased by 3 dB, and this step will be executed again until the proportion of the remaining candidate single TU resources is not less than the threshold.

Step 903: The V2X UE calculates the S-RSSI of each remaining candidate single TU resource within the resource selection window, that is, the S-RSSIs of M*N PRBs of candidate single TU resources Si are averaged to obtain S-RSSI$_{i\_ave}$; then, all the remaining resources are sequenced in an order from the smallest to the largest S-RSSI$_{i\_ave}$; and, one candidate single TU resource is randomly selected from part of candidate single TU resources having the lowest S-RSSI$_{i\_ave}$ as a transmission resource. For example, resources are successively selected from the remaining resources in an order from the smallest to the largest S-RSSI$_{i\_ave}$, until the proportion of all the selected resources in the total resources within the resource selection window is not less than the predefined threshold; and, one resource is randomly selected from the selected resources as a transmission resource.

A schematic flow will be shown below to achieve the effects of the steps 901 to 903.

step1: A UE attempts to detect a PSCCH within a sensing window of $N_p$ transmission resource pools and/or resource groups, and then determines the position and priority of a time-frequency resource for the scheduled PSSCH in the $N_p$ transmission resource pools and/or resource groups; or, the UE attempts to detect a PSCCH within a sensing window of only part of transmission resource pools and/or resource groups, and then determines, by the detected PSCCH, the position and priority of a time-frequency resource for the PSSCH scheduled by the detected PSCCH and the position and priority of a time-frequency resource for a PSSCH in other transmission resource pools and/or resource groups.

step2: The UE detects the PSSCH-RSRP of the scheduled PSSCH in the $N_p$ resource pools and/or resource groups, and excludes candidate single TU resources having a PSSCH-RSRP greater than a specific threshold within a resource selection window (if a sub-channel having a PSSCH-RSRP greater than the specific threshold is overlapped with a candidate single TU resource, this candidate single TU resource is excluded). That is, candidate single TU resources satisfying the requirement are reserved, and the step3 will be executed. If there are some time-frequency resources having a PSSCH-RSRP not greater than the RSRP threshold and the relationship between these time-frequency resources does not satisfy a predefined pattern relationship, or these time-frequency resources cannot form or belong to one candidate single TU resource. Accordingly, these resources will be excluded.

As an implementation, the UE can perform PSSCH-RSRP measurement on the $N_p$ transmission resource pools and/or resource groups according to the PSCCH received in the step1, and exclude resources having a PSSCH-RSRP greater than the specific threshold to obtain available resources in the $N_p$ transmission resource pools. The UE only reserves corresponding resources in the $N_p$ transmission resource pools and/or resource groups that satisfy the predefined pattern relationship (that is, the reserved resources use a candidate single TU resource as granularity) and then performs the step3, that is, all resources not satisfying the predefined pattern relationship are excluded. For example, the predefined pattern relationship between candidate single TU resources is manifested as N adjacent TUs in the time dimension. If there are N=4 resource pools, in the first resource pool, TUs having a PSSCH-RSRP not greater than the RSRP threshold are #1, #5, #21 and #49; in the second resource pool, TUs having a PSSCH-RSRP not greater than the RSRP threshold is #2, #10, #26 and #50; in the third resource pool, TUs having a PSSCH-RSRP not greater than the RSRP threshold is #3, #15, #27, #35 and #51; and, in the fourth resource pool, TUs having a PSSCH-RSRP not greater than the RSRP threshold is #4, #16 and #32. In this case, in the four resource pools, only TUs #1, #2, #3 and #4 satisfy the predefined pattern relationship and can form a single TU. Therefore, this single TU is reserved. Or, the UE excludes or reserves time-frequency resources directly by using a single TU as granularity.

It is to be noted that multiple groups of PRBs can be contained in one TU. If all PRB groups in one TU have a PSSCH-RSRP exceeding the RSRP threshold, it is considered that all resources of TUs are excluded. If only part of PRB groups have a PSSCH-RSRP exceeding the RSRP threshold, only these RRB groups are excluded, and resources of other PRB groups of this TU are reserved.

As another implementation, the UE can perform, in the first transmission resource pool and/or resource group, PSSCH-RSRP measurement on $PSSCH_{i,1}$ according to the PSCCH received in the step1. If the PSSCH-RSRP of the $PSSCH_{i,1}$ is greater than a threshold, it is unnecessary to perform RSRP measurement on frequency resources in TUs of all other transmission resource pools and/or resource groups which belong to a same single TU within the resource selection window corresponding to the $PSSCH_{i,1}$, and all time-frequency resources of this single TU Si will be excluded. If the PSSCH-RSRP of the $PSSCH_{i,1}$ is not greater than the threshold, time-frequency resources in a second transmission resource pool that belongs to a same single TU S1 as the $PSSCH_{i,1}$ will be detected; and, if there is a $PSSCH_{i,2}$, PSSCH-RSRP measurement will be performed. The rest can be done in the same manner. If the PSSCH-RSRP of all time-frequency resources of the single TU Si in the $N_p$ transmission resource pools and/or resource groups does not exceed the RSRP threshold, this single TU can be reserved. If the PSSCH-RSRP of at least one TU exceeds the RSRP threshold, the single TU will be excluded.

The foregoing description shows schematic processes. In the present disclosure, it is not excluded that the UE achieves the effects described herein by other methods.

In the step2, if the proportion of the remaining candidate single TU resources in the total candidate single TU resources within the resource selection window is less than Thr_step2 (for example, Thr_step2=20%), the specific threshold is increased by 3 dB, and this step will be executed again until the proportion of the remaining resources is not less than Thr_step2.

step3: In the $N_p$ transmission resource pools and/or resource groups, the UE averages the S-RSSIs of single TUs Si of the remaining resources within the resource selection window, then sequences the single TUs in an order from the smallest to the largest $S-RSSI_{i\_ave}$, and randomly selects one single TU $S_j$ from parts of candidate single TU resources having the lowest $S-RSSI_{i\_ave}$ as a transmission resource.

In the way 2, when there is only one transmission resource pool and/or resource group, that is, $N_p=1$, a sensing operation is performed within the transmission resource pool, resource selection is performed by using the candidate single TU resource defined above as granularity, the eventually selected candidate single TU resource satisfies the predefined pattern relationship, or the difference in time from the first TU to the last TU of the candidate single TU resource does not exceed the predefined time threshold. Therefore, in the step1 described above, a PSCCH is detected in this transmission resource pool so as to determine a PSSCH. In the step 2, if there are remaining TUs #1, #2, #3, #4, #5, #10, #15, #16, #21, #26, #27, #32, #51, #52 and #53 in the resource pool, the UE can select only TUs #1, #2, #3 and #4 (if the starting point of the candidate single TU resource can only be a logic number satisfying 4×+1 in the resource pool, where x is a positive integer), or TUs #1, #2, #3 and #4 and TUs #2, #3, #4 and #5 (if the starting point of the candidate single TU resource can be any one TU in the transmission resource pool), and the remaining other TUs are excluded. FIG. 9 shows an example. For the convenience of description and illustration, it is assumed that each candidate single TU resource contains four TUs which are logically adjacent in the transmission resource pool; the starting point of each candidate single TU resource is 4x+1; each TU contains M PRBs, and the positions of the M PRBs are identical; and, M PRBs of each candidate single TU resource are not overlapped with each other. It is assumed that each TU can be divided into five groups of M PRBs.

Figure 10:
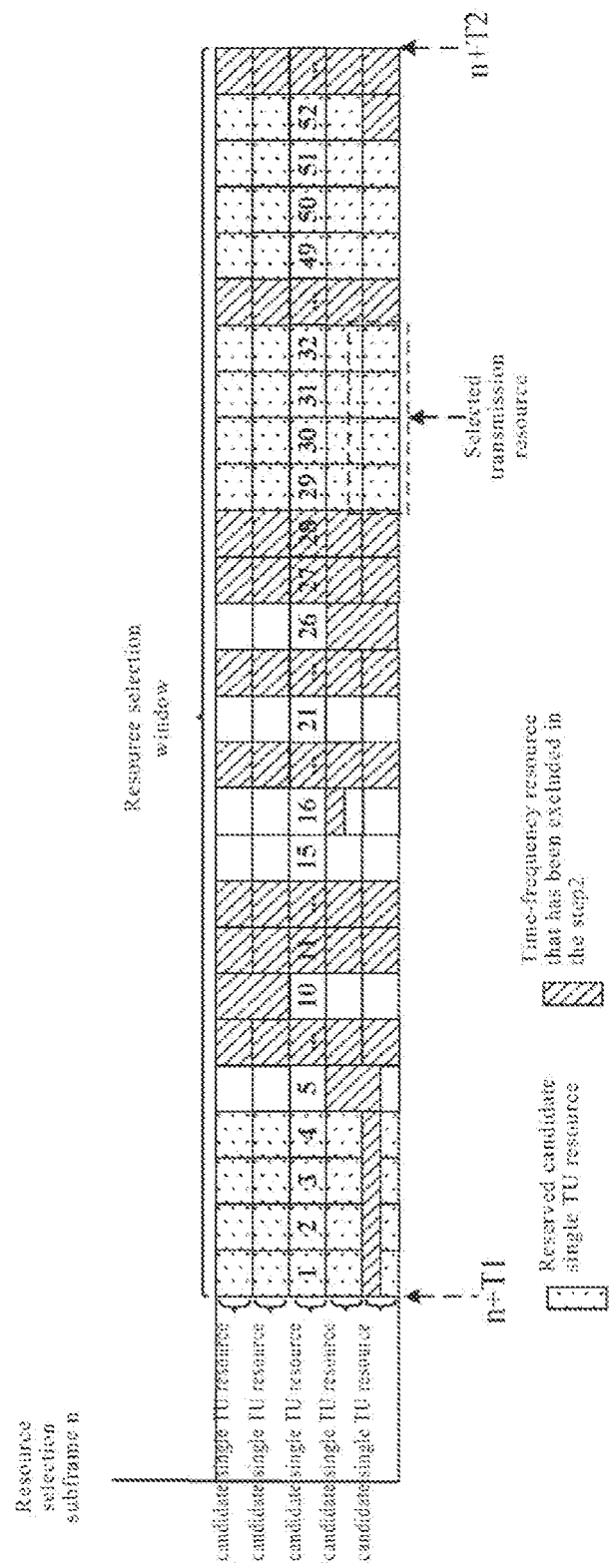
FIG. 10 is a schematic diagram of resource selection according to an embodiment of the present disclosure.

As shown in FIG. 10, there are time-frequency resources not passing through RSRP measurement in TUs #1-#5, #10, #10, #16, #21, #26, #29-#32 and #49-#52 (no PSCCH is detected) and there are time-frequency resources having a PSSCH-RSRP not exceeding the RSRP threshold in these TUs. Wherein, the TUs #1-#4, #29-#32 and #49-#52 can form candidate single TU resources. Wherein, in the TUs #1-#4, there are four groups of M PRBs satisfying the requirement; in the TUs #29-#32, there are five groups of M PRBs satisfying the requirement; and, in the TUs #49-#52, there are four groups of M PRBs satisfying the requirement. Therefore, in the step2, 13 candidate single TU resources can be reserved. Resources in other TUs can be excluded. It is assumed that the total number of candidate single TU resources required to be reserved is at least 2% of the total number of candidate single TU resources within the resource selection window (generally, this number will not be too small, for example, 20%. For the convenience of illustration, this number is assumed as 2%). If the length of the resource selection window is 100 TUs, there are total 125 candidate single TU resources. In this case, the resources to be reserved contain at least 25 candidate single TU resources. Therefore, it is necessary to increase the RSRP threshold, and some resources need to be selected so that the requirement of at least 25 candidate single TU resources is satisfied. Subsequently, RSSI measurement in the step3 is performed on the 25 resources. By taking the first candidate single TU resource formed by the TUs #1-#4 as example, it is necessary to average all RSSIs of the first to $M^{th}$ PRBs in the TUs #1-#4. After the step3, the UE randomly selects $(4M+1)^{th}$ to $(5M)^{th}$ PRBs of the TUs #29-#32 as transmission resources.

It is to be noted that, for the convenience of illustration, the sensing window is not shown, and only the resource selection window is shown. However, it should be understood by those skilled in the art that the UE exclude resources within the resource selection window by using the result of sensing within the sensing window. Moreover, although FIG. 10 shows that the M PRBs of each candidate single TU resource are not overlapped with each other, the present disclosure is also applicable to the case where M PRBs of each candidate single TU resource are overlapped with each other. If the transmitting UE does not have the reception beam capability, the transmitting UE performs omnidirectional sensing on different TUs in $N_p$ resource pools or one resource pool.

If the transmitting UE has the reception beam capability, sensing performed by the transmitting UEs in different TUs in $N_p$ resource pools and/or resource groups may be in different directions. For example, the transmitting UE supports the reception of two beams and the transmission of four beams, and N=4. The UE uses reception beams in a same direction in two resource pools. Two resource pools, in which reception beams in a same direction are used, can be implemented by the UE or configured by the base station, or predefined by the system. Similarly, during the actual transmission between UEs, if the repetitive transmission needs to be performed for 4 times, it can be configured by the base station or predefined by the system such that beams of a transmitting UE and beams of a receiving UE can correspond to each other. For example, a same transmission beam is used every two transmissions, and the two transmissions exactly correspond to different reception beams used by the receiving UE.

If the transmission and reception beams of a UE are reciprocal, that is, the spatial characteristics of the transmission and reception beams are strongly correlated, the direction of sensing can be determined according to the transmission beams of the UE. In order to reduce the complexity of the UE, preferably, the UE can sense only the direction of each transmission beam and the reverse direction of the transmission beam.

Embodiment 3

The transmitting UE has been mainly described in Embodiments 1 and 2. In order to ensure the normal operation of the V2X communication, it is necessary to restrict the receiving UE correspondingly.

Preferably, if it is predefined or configured that N TUs of transmission resources (candidate single TU resources) of the transmitting UE use identical frequency-domain resources, for the receiving UE, the receiving UE can infer frequency-domain resources for other N−1 TUs if this UE has received a PSCCH in one TU. The receiving UE may not depend upon the explicit frequency-domain resource indication information, for example, UE may not depend upon the frequency-domain resource indication information in PSCCHs in other N−1 TUs. The frequency-domain resources are PSCCHs and/or PSSCHs.

Preferably, it is predefined or configured that N TUs of transmission resources (candidate single TU resources) of the transmitting UE use different frequency-domain resources, and the specific relationship between the N frequency-domain resources is predefined and configured. Then, for the receiving UE, if this UE has received a PSCCH of one TU, the receiving UE may infer frequency-domain resources for other N−1 TUs. The receiving UE may not depend upon the explicit frequency-domain resource indication information. The frequency-domain resources are PSCCHs and/or PSSCHs.

Preferably, it is predefined or configured that N TUs of transmission resources (candidate single TU resources) of the transmitting UE may use different frequency-domain resources, and the specific relationship between the N frequency-domain resources is not limited. Then, the receiving UE can only attempt to detect the positions of all possible frequency-domain resources for each TU of one candidate single TU resource or each TU in a resource pool, so as to determine the position of a PSCCH in each TU.

Preferably, if it is defined or configured that the N TUs of transmission resources (candidate single TU resources) of the transmitting UE satisfy a predefined pattern relationship, upon receiving a PSCCH in one TU, the receiving UE can infer TUs and/or frequency-domain information for other N−1 transmissions, without depending upon the explicit TU indication information. For example, UE may not depend upon the information indicative of TUs in PSCCHs in other N−1 TUs, or indication information of the N TUs is not borne in PSCCHs.

Preferably, if it is predefined or configured that the N TUs of transmission resources (candidate single TU resources) of the transmitting UE may not satisfy the predefined pattern relationship, the transmitting UE can contain, in the PSCCH transmitted in at least one TU, information indicative of the time and/or frequency domain of at least one another TU.

Preferably, when the transmitting UE receives signals, if the received PSCCHs indicate information available for combing, the receiving UE can combine the received multiple PSSCHs; or otherwise, the PSSCH and/or PSCCH of the TUs cannot be combined.

Figure 11:
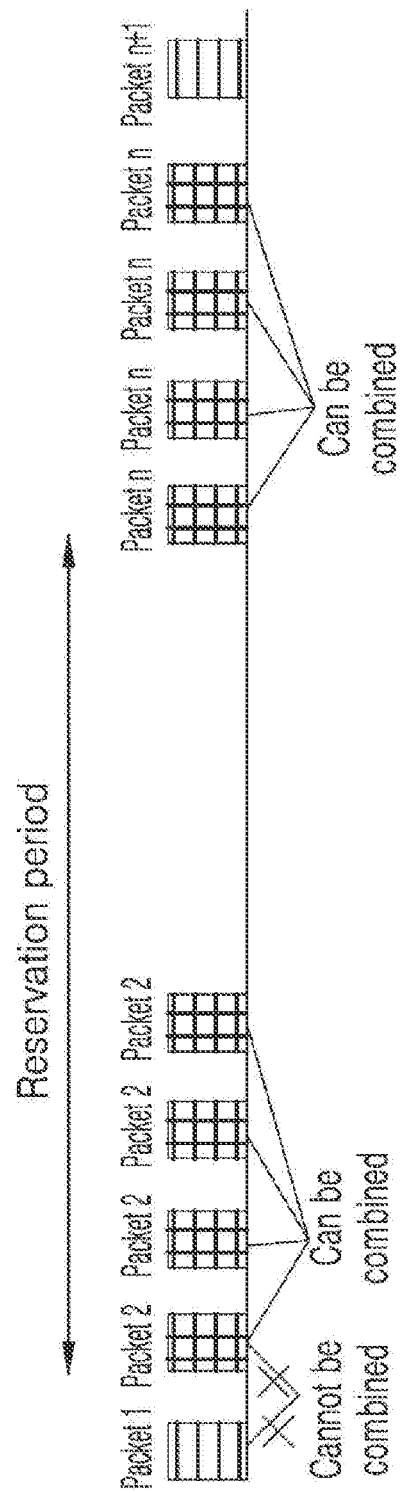
FIG. 11 is a schematic diagram of combing PSSCHs and/or PSCCHs according to an embodiment of the present disclosure.

Preferably, when the receiving UE receives signals, candidate single TU resources Si are determined according to the predefined pattern relationship information, and PSSCHs and/or PSCCHs in N TUs belonging to Si can be combined, as shown in FIG. 11. Preferably, the predefined pattern relationship information can be configured by a V2X control node or a base station.

Preferably, if the receiving UE performs reception based on beams, the receiving UE needs to determine the position (or pattern) of each possible candidate single TU resource Si, so as to determine the cadence during the Rx beam sweeping.

Figure 12:
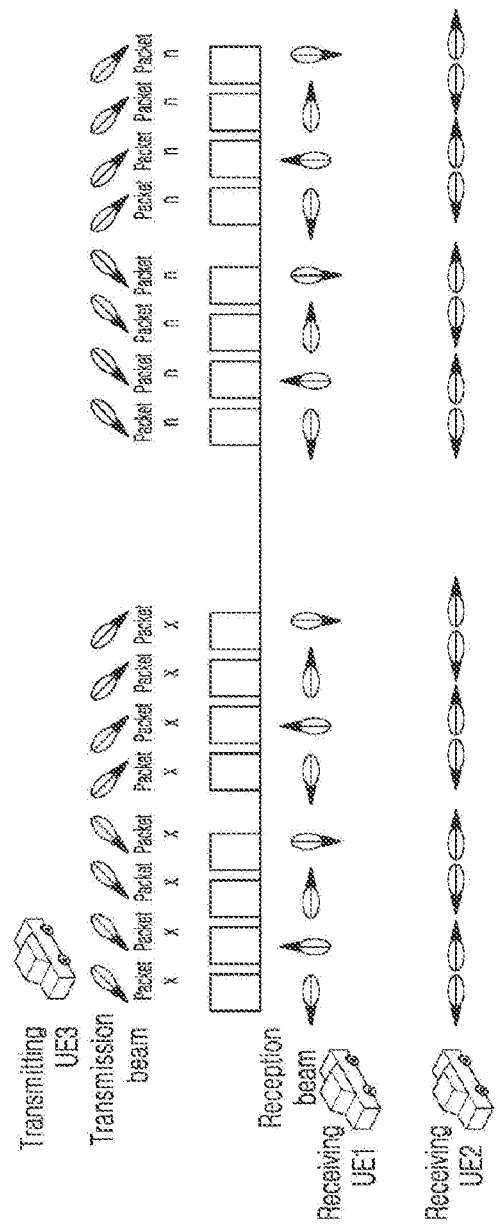
FIG. 12 is a schematic diagram of the beam direction of a transmitting UE and of a receiving UE according to an embodiment of the present disclosure.

Preferably, if the receiving UE performs reception based on beams and the transmitting UE performs transmission based on beams and when the receiving UE receives signals, it is necessary to determine patterns that can be received by Rx beam sweeping. For example, the receiving UE needs to determine patterns during $N_2$ transmissions of the transmitting UE in a same direction. In a real system, the reception beam capability of each receiving UE may be different. For example, a receiving $UE_1$ supports four reception beams, while a receiving $UE_2$ supports two reception beams. Then, for the receiving $UE_1$, it is necessary to determine patterns during the transmission of $N=N_2=4$ beams by a transmitting $UE_3$ in a same transmission beam direction; and, for the receiving $UE_2$, it is only necessary to know patterns during the transmission of two beams by the transmitting $UE_3$ in a same transmission beam direction. However, during the broadcasting transmission, the transmitting UE cannot perform optimization on each receiving UE. Therefore, N is determined according to a robust assumption. In this case, for the receiving $UE_2$, two transmissions can be received in a reception beam direction and can be combined. As shown in FIG. 12, the transmitting $UE_3$ has two transmission beams, and the transmitting $UE_3$ repetitively transmits a packet for N=4*2=8 times. The receiving UE may not know the temporal relationship between the first transmission beam and the second transmission beam of the transmitting $UE_3$, but the receiving UE needs to know the pattern transmitted in a transmission beam by the transmitting $UE_3$.

Or, when the receiving UE receives signals, it is necessary to determine a pattern of $N_2$ transmissions of the transmitting UE in a same direction and a group of patterns having a length of $N_2$ during the $N_1$ transmissions of the transmitting UE. For example, similarly, as shown in FIG. 12, the transmitting $UE_3$ has two transmission beams, the receiving $UE_1$ has four reception beams, and the receiving $UE_2$ has two reception beams. If it is assumed that the transmitting $UE_3$ transmits a signal for eight times, the specific pattern of the eight transmissions is that four transmissions in a same transmission direction are performed in adjacent TUs, and the interval between transmissions in different transmission directions is 8. That is, TUs #0, #1, #2 and #3 are transmitting beams 1, and TUs #8, #9, #10 and #11 are transmitting beams 2. Thus, both the receiving $UE_1$ and $UE_2$ can use different reception beams in the TUs #0, #1, #2 and #3, similarly to the TUs #8, #9, #10 and #11.

Preferably, the direction of a beam on which the UE transmits a PSCCH and the direction of a beam on which the UE transmits a PSSCH scheduled by this PSCCH satisfy a predefined relationship. For example, the beams are located in a same direction.

Preferably, the direction of the beam on which the UE receives a PSCCH and the direction of the beam on which the UE receives a PSSCH scheduled by this PSCCH satisfy a predefined relationship. For example, the beams are located in a same direction.

Preferably, the PSCCH can bear beam information of the scheduled PSSCH.

Embodiment 4

During the operation of an actual V2X system, the system load may be very high, so that the interference between UEs will be increased and the reliability of communication will be reduced. In order to keep the system stability, congestion control needs to be performed.

Preferably, when a UE has N transmission resource pools and/or resource groups, the UE determines transmission parameters in $N_p$ resource pools according to a CBR of TUs in the N transmission resource pools and/or resource groups. For example, the transmission parameters contain the number of sub-channels occupied in each resource pool, the Modulation and Coding Scheme (MCS), the number (K) of transmissions of a packet, the occupancy cycle of resources, the transmission power parameter or more.

Preferably, for the N transmission resource pools and/or resource groups, the UE calculates an Occupancy Ratio (CR) of resources and/or the maximum value (CRlimit) of the CR of resources, respectively.

Preferably, the UE determines reserved resources for the N transmission resource pools and/or resource groups, respectively. One or more resources are reserved at a reservation interval, and it is assumed that all the reserved resources are used for transmission of the UE.

Preferably, for the N transmission resource pool and/or resource groups, the UE determines, according to the measured value of the CBR and the priority, whether to discard some reserved resources so as to satisfy the requirements for the CBR.

Embodiment 5

In the prior art, on one carrier of the V2X system, a subframe used for V2X synchronization channel is removed, and some reserved subframes are removed, so that the number of remaining subframes in a system frame number (SFN) period is an integer multiple of the bit-map length $L_{bitmap}$ of the configured resource pool. The Time Division Duplexing (TDD) system also needs to remove all downlink subframes, and the set of the remaining subframes are recorded as $(t_0^{SL}, t_1^{SL}, \ldots, t_{Tmax}^{SL})$, $0 \leq t_i^{SL} < 10240$, and $0 \leq i < T_{max}$, in which i is the logical number of the remaining subframes.

In order to support a more flexible system configuration, in some communication systems, such as 5G systems, the base station semi-statically configures uplink slots, downlink slots, and flexible slots. In a flexible slot, the base station may perform cellular downlink transmission, such as transmission of a PDCCH, transmission of a PDSCH or other downlink signals. The base station may also schedule the UE to perform cellular uplink transmission. In such a system, in order to avoid the interference between the V2X communication and the cellular communication, when configuring the resource pool of the V2X communication, the resources that may cause interference may be removed by using at least one of the following methods or a combination of multiple methods:

(1) Removing the semi-statically configured downlink slots/downlink symbols.

(2) Removing the semi-statically configured downlink slots/downlink symbols and the flexible slots/flexible symbols.

(3) Removing the semi-statically configured downlink slots/downlink symbols and the semi-statically configured downlink or flexible slots/symbols for PDCCH transmission.

(4) Removing the semi-statically configured slots/symbols for a specific downlink signal/channel transmission. The specific downlink signal/channel is: a downlink synchronization channel and/or PBCH and/or system information (for example, SIB1) and/or a specific periodic reference signal, such as a reference signal for RRM or RLM measurement.

(5) Removing the semi-statically configured slots/symbols for a specific uplink signal/channel transmission. The specific uplink signal/channel is: the slots/symbols used for random access to PRACH.

Figure 13:
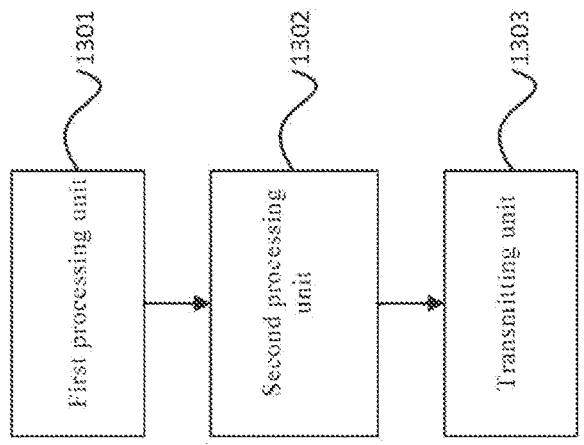
FIG. 13 is a schematic structure diagram of a user equipment according to an embodiment of the present disclosure.

Based on the resource allocation method provided by the present disclosure, the present disclosure further provides a user equipment, as shown in FIG. 13, and the user equipment includes following components:

A first processing unit 1301 configured to sense each configured resource pool and/or each group of resources to obtain a result of sensing, the result of sensing containing a set of remaining candidate single TU resources of each resource pool.

A second processing unit 1302 configured to select, from the set of remaining candidate single TU resources of each resource pool and/or each group of resources, one candidate single TU resource as a transmission resource.

A transmitting unit 1303 configured to transmit, via the transmission resource, a packet to be transmitted which is borne by the transmission resource.

Wherein the candidate single TU resource is a time-frequency resource which consists of N TUs and M PRBs and is used for transmitting a same packet, where N>1 and M>1.

In all embodiments of the present disclosure, when V2X services to be received or transmitted by a UE are of different types, transmission beams and/or reception beams may be different due to different service types. For example, in a platooning service scenario, platoons in the platooning may only need to be transmitted backward and/or forward. In this case, even if the UE is able to support multiple transmission beams, the UE only needs to use forward and/or backward transmission and/or reception beams. Naturally, in the embodiments of the present disclosure, the determination of a transmission resource pool and a reception resource pool, the selection of a transmission resource by sensing, the determination of the direction of transmission and/or reception beams and the like can be different due to different services.

In the internal communication of the auto platooning, the communicated information is only for the UEs in the group, so the transmitted data is directional. Additionally, to ensure the safety of the auto platooning, the transmitted information among the members in the group should be confidential to the UEs outside the platooning as far as possible. However, the current V2X communication cannot meet the two requirements above.

Figure 14:
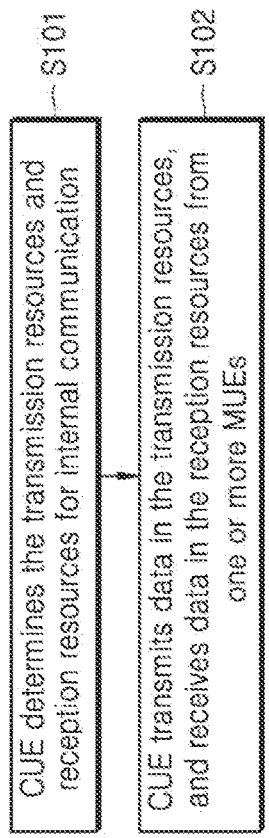
FIG. 14 is a flowchart of a method of sidelink communication performed by a CUE, according to some embodiments of the present disclosure.

In order to solve the problem, FIG. 14 shows an improved V2X communication method performed by a CUE according to the inventive concept of the present application. It is only exemplary not intended to limit the scope of the disclosure as claimed.

As shown in FIG. 14, the improved V2X communication method includes the following steps:

Step S101: the CUE determines the transmission resource and reception resource for the internal communication.

The transmission resource includes at least one of the two pieces of information:

1. the time-frequency domain resource for transmitting the carried data in PSSCH, or a set of time-frequency resources that may be used for the transmission above in PSSCH.

2. the time-frequency domain resource used to transmit an indication in PSCCH indicating the transmission described above in PSSCH, or a set of time-frequency resources that may be used for the transmission above in PSCCH.

The reception resource(s) refer(s) to a time-frequency domain resource for receiving the carried data in PSSCH, or a set of time-frequency resources that may be used for the transmission above in PSSCH. In some embodiments, the reception resource may further include an indication for receiving the data. The reception resource(s) may further include the time-frequency resource in PSCCH for the reception of the indication of the PSSCH above, or the possible set of time-frequency resources of the PSCCH above.

In the present application, the way how any UE in the platooning determines itself to be a CUE is not limited. For example, a UE may determine whether it is a CUE according to the indication received in its own application layer or by receiving signaling of the RSU or NB.

The CUE may determine the locations of the transmission resources and the reception resources for internal communication by receiving the signaling of NB or detecting the channel, and the carriers where the transmission resources and the reception resources for the internal communication are located may be the same as or different from the carriers where the resources for the external communication of the CUE are located. If carriers for the internal communication and those for the external communication are the same, the former and the latter may belong to the same resource pool or different resource pools. For the UEs within the coverage of a cellular network, the carrier frequency for the internal communication and the configuration of resource pool may be determined by receiving the signaling of the NB, while for the UEs outside of the coverage of the cellular network, the carrier frequency for the internal communication and the configuration of resource pool may be determined by the CUE, or determined by the CUE according to the pre-configuration information.

In the present application, according to the first scheme for determining resources, the CUE determines the carrier for internal communication and the configuration of resource pool by receiving the signaling of the NB, and continue to receive the indication in a particular field in the downlink control channel of the NB to determine the locations of the transmission resources and reception resources. The CUE may determine the locations of all the resources above by receiving in a downlink control channel or multiple downlink control channels of the NB, and each of the resources above may be explicitly indicated by a particular field in the downlink control channel, or there may be binding relations among the multiple resources above, and only the positions of some resources are explicitly indicated in the downlink control channel, while the other resources are obtained through the binding relations between the explicitly indicated resources and the other resources.

According to the second scheme for determining resources, the cue determines the carrier for internal communication and the configuration of resource pool by receiving the signaling of the NB, and continues autonomously to determine the positions of the transmission resources and the reception resources in the resource pool of the carrier. In this case, in a preferred embodiment, the carrier configured by the NB for internal communication is different from the carrier for external communication by the CUE, or the carrier configured by the NB for internal communication may be the same as the carrier for external communication by the CUE, but the resource pools are different. There should be some interval, such as k time slots, between the time point the transmission resource located determined by the CUE and the time point the first reception resource located thereafter, where k is a particular value defined by a standard, configured or pre-configured by the network, or autonomously determined by the CUE.

According to the third scheme for determining resources, the CUE determines the transmission resources and the reception resources for internal communication by detecting the channel. In this case, in a preferred embodiment, the carrier used by the CUE and the resource pool for internal communication are the same as the carrier used by the CUE and resource pool for external communication. Similar to the second scheme, there should be some interval, such as k time slots, between the time point the transmission resource located determined by the CUE and the time point the first reception resource located thereafter, where k is a particular value defined by a standard, configured or pre-configured by the network, or autonomously determined by the CUE.

According to the fourth scheme for determining resources, the CUE can autonomously select a carrier within a certain range, and determine the configuration of the resource pool in the carrier, and continues to determine the locations of transmission resources and reception resources for the UE.

In step S102, the CUE transmits data in the transmission resources and receives data from one or more other MUEs in the reception resource.

Figure 15:
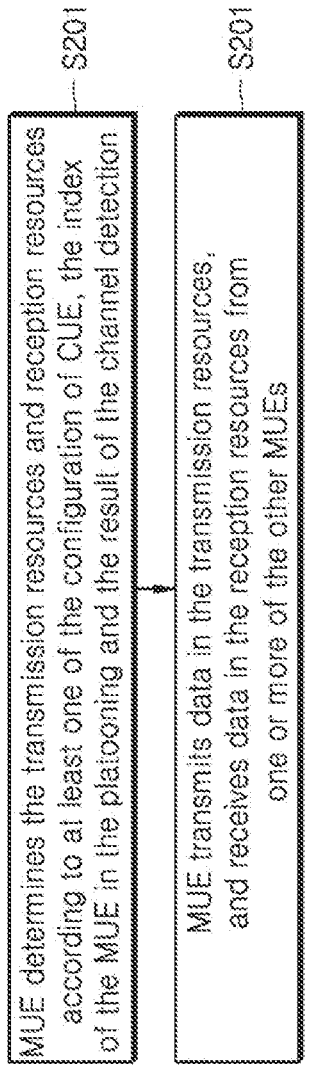
FIG. 15 is a flowchart of a method of sidelink communication performed by a MUE, according to some embodiments of the present disclosure.

In order to solve the problem above, FIG. 15 shows an improved V2X communication method performed by an MUE according to the inventive concept of the present application. It is only exemplary not intended to limit the scope of the disclosure as claimed.

As shown in FIG. 15, the improved V2X communication method includes the following steps:

Step S201: The MUE determines the transmission resources and the reception resources for internal communication according to at least one of the CUE configuration, the number of the MUE in the platooning, and the result of the channel detection.

In the application, the way how any UE in the platooning determines itself to be a MUE is not limited. For example, a UE may determine whether it is a MUE according to the indication received in its own application layer or by receiving signaling of the RSU or NB.

The transmission resource refers to a resource in time-frequency domain for transmitting the carried data in PSSCH, a set of time-frequency resources that may be used for the transmission in PSSCH, a resource in time-frequency domain for transmitting the indication of the transmission in PSCCH in PSCCH, or a set of time-frequency resources that may be used for the transmission in PSCCH.

The reception resource refers to a resource in time-frequency domain for receiving the carried data in PSSCH, a set of time-frequency resources that may be used for the transmission in PSSCH. In some implementations, the reception resources may further include the resource in the time-frequency domain of PSCCH for receiving the indication in PSSCH, or a set of time-frequency resources that may be used for the transmission in PSCCH.

For any MUE, it may correspond to a unique number in a group. The number may be allocated and indicated by the CUE, RSU, or NB. In the present application, it assumes that the CUE is the first UE in the auto platooning, with the index 0; the index of the first MUE after the CUE is 1, the index of the second MUE is 2, and so on.

Step S202: The MUE transmits data in the transmission resource, and receives the data from the one or more other MUEs in the reception resource.

For clarity, the solutions above of the present application will be further explained with the interactivities among the UEs with reference to the scenarios. The details are as follows.

Embodiment 6

This embodiment is for the CUE. In the embodiment, the CUE may determine carrier, the configuration of resource pool, and the transmission resources and reception resources of the internal communication through the first, second, third, and fourth schemes above for determining the resources. The CUE reception resources should include the transmission resources of all the MUEs in the platooning. Therefore, the number of reception resources should not be less than the number of MUEs in the current platooning. In a preferred embodiment, if the number of UEs in the current automatic platooning is U, and U is less than the maximum number of UEs that the group may contain, the number of CUE reception resources should be U+1, or should be increased to U+1 after receiving the request for joining the group from a UE outside of the platooning, wherein the additional reception resource is used for the new MUE that may join the platooning. Additionally, the time interval between two adjacent transmission resources should be less than a certain value, for example, the time interval should be less than the minimum transmission delay of the communication within the group.

Figure 16:
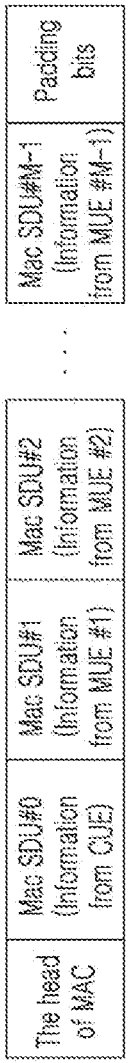
FIG. 16 is a schematic diagram of combining data through different MAC SDUs, according to some embodiments of the present disclosure.

In the embodiment, the CUE may need to forward the information from the outside of the platooning to the MUE inside the platooning. Meanwhile, the information from one MUE within the platooning needs to be forwarded to other MUEs within the platooning. Therefore, the information transmitted by the CUE may include multiple parts, which include the information from its own application layer, the information from the first MUE in the platooning, the information from the second MUE in the platooning, . . . , and the information from the Uth MUE within the platooning. According to an implementation of the present application, the CUE distinguishes information through different MAC SDUs (Medium Access Control Service Data Units), as shown in FIG. 16. Additionally, the CUE may further indicate, in the transmitted data or through one or more PSCCHs, the location of transmission resource of the next PSSCH for each or some of the MUEs, the PSSCH modulation and coding scheme (MCS) of each or some of the MUEs, a transmission power control parameter of each or some of the MUEs, an indication of whether each or some of the MUEs last transmitted data was successfully received or not, and the like.

In the embodiment, since the relative speed between the sending UE and the receiving UE in the internal communication is very low, or even zero, and the physical signal between them is usually propagated by line of sight (LOS), the density of the reference signals in the time domain of the transmission resources (including the PSCCH transmission resources and the PSSCH transmission resources) for internal communication should be less than the density of the reference signals in the time domain of the transmission resources for external communication, where the density in the time domain can be characterized as the interval between two adjacent reference signals in time. Additionally, the first symbol in the transmission resource can be used for PSSCH or PSCCH transmission, i.e., it is not needed to assist in receiving the automatic gain control (AGC) adjustment of the UE. If the current CUE only performs internal communication in the current carrier, or the CUE only performs internal communication in the current resource pool, the last symbol of the transmission resource may be used for PSSCH or PSCCH transmission, i.e., it is not needed to be used for the CUE to convert from transmitting to receiving.

Embodiment 7

The embodiment is for the MUE, which corresponds to the CUE in embodiment 6. In the embodiment, the MUE determines the locations of the transmission resource and the reception resource by receiving the signaling of the CUE. The MUE may receive the signaling of the CUE from a transmission resource of the CUE, or receive the signaling of the CUE forwarded by other MUEs in the transmission resources of the other MUEs. The MUE will use P time slots belonging to the resource pool after the time slot in which the transmission resource of the CUE is located as a transmission period, where P is a particular value. All the reception resources and transmission resources are repeated by the transmission period until the MUE receives a new indication of the signaling of the CUE. The MUE may determine the value of P by receiving the signaling of the CUE or the NB when it joins the auto platooning, or determine the value of P according to the pre-configuration or the definition in a standard. For example, if the MUE determines that there is a transmission resource in the time slot n according to the signaling of the CUE, the MUE considers that a transmission resource still exists in the time slot after multiple transmission periods until the MUE receives a new indication of the transmission resource of the CUE. The MUE may determine the information above by receiving the signaling of the CUE when it joins the auto platooning, and the carrier that the MUE receives the signaling may be different from that in which the transmission resource and the reception resource are located. If the carrier that the MUE receives the signaling is the same as that in which the transmission resource and the reception resource are located, the resource pool in which the MUE receives the signaling may be different from that in which the transmission resource and the reception resource are located. In a preferred embodiment, the signaling may be transmitted in the carrier and resource pool that CUE uses for external communications.

If the transmission resource of the MUE indicated by the CUE is greater than the resource required by the MUE to transmit in PSSCH and PSCCH, the MUE shall select a resource capable of carrying the transmission above in PSSCH and PSCCH within the transmission resources indicated by the CUE. The MUE may randomly select the required transmission resources within the transmission resources, or select the required transmission resources according to the way to select resource in the transmission mode 4 defined in the current standard.

According to the first scheme for receiving in the embodiment, the reception resource of the MUE only includes the transmission resource of the CUE. In this case, the MUE determines the information from other MUEs within the platooning by receiving the data from the CUE, that is, the data transmitted by the CUE includes the information from other MUEs of the platooning. According to the second scheme for receiving in the embodiment, the reception resource of the MUE includes not only the transmission resource of the CUE but also the transmission resources of the other MUEs in the platooning. In this case, the data transmitted by the CUE may not include the information from the other MUEs of the platooning.

If the signaling of the CUE received by the MUE includes the MCS indication of transmitted data, the MUE should use the indicated MCS to transmit in the PSSCH in the transmission resource of PSSCH indicated by the MUE. The density in the time domain of the demodulation reference signal transmitted by the MUE in the PSSCH should be the same as the density of the time domain of the received demodulation reference signal of CUE in PSCCH and PSSCH. In a preferred embodiment, in the resource of PSSCH transmitted by the MUE, the distribution of demodulation reference signals within the resources of PSCCH transmitted by the CUE is the same as that within the resources of PSSCH transmitted by the CUE. If the signaling of the CUE received by the MUE includes the transmission power control parameter, the MUE should set or adjust the transmission power in PSSCH according to the control parameter.

Additionally, the first symbol in the transmission resource may be used for data transmission, i.e., it is not needed to assist the reception of AGC adjustment of the UE. If it is the first scheme for receiving by MUE, according to an implementation of the embodiment, if the time slot following the time slot in which the current transmission resource of the MUE is located includes the reception resource of the MUE, the MUE uses the last symbol of the transmission resource for the conversion from transmitting to receiving. Otherwise, the MUE uses the last symbol of the transmission resource for PSSCH transmission. According to another implementation of the embodiment, the MUE always uses the last symbol for PSSCH transmission.

Figure 17:
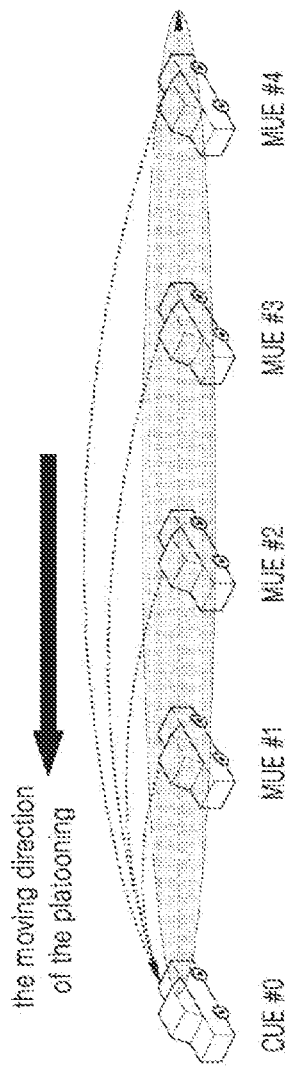
FIG. 17 is a schematic diagram of internal communication according to Embodiment 6 and Embodiment 7 of the present disclosure.

The method of the internal communication described in Embodiment 6 and Embodiment 7 is as shown in FIG. 17.

Embodiment 8

The present embodiment is regarding a CUE and a MUE.

For any UE in the automatic platooning, according to an implementation of the embodiment, for the nth time slot in the resource pool for internal communication, if n mod M=i, the nth time slot includes the transmission resource of the ith UE in the automatic platooning, wherein M is the number of UEs in the automatic platooning. In this way, M time slots in the resource pool after the mth time slot in the resource pool (including m) are defined as a transmission period, wherein m is an arbitrary value that satisfies m mod M=0 within the range of index of the resources in the resource pool.

For any UE in the automatic platooning, according to another implementation of the embodiment, for the nth time slot in the resource pool for internal communication, if n mod 2=0, there are the transmission resources of the even-numbered UEs in the automatic platooning in the nth time slot. Otherwise, there are the transmission resources of the odd-numbered UEs in the automatic platooning in the nth time slot. In this way, 2*k time slots in the resource pool after the mth time slot in the resource pool (including m) are defined as a transmission period, wherein m is an arbitrary value that satisfies m mod M=0 within the range of index of the resources in the resource pool, K is a particular value, which may be defined by a standard, configured by NB or by CUE, for example, K=1.

For the ith UE in the auto platooning, if 0<i<M-1, the reception resources of the ith UE include only the transmission resources of the (i+1)th UE and the (i-1)th UE. Additionally, the data transmitted by the ith UE should include the information from itself and the information received from the (i+1)th UE and the (i-1)th UE. For UEs supporting directional beam transmission, in the transmission resources, the direction of the transmitted beam should at least be pointing to the (i+1)th UE and the (i-1)th UE. If i=0, that is, the UE is CUE, then the reception resource of the UE only includes the (i+1)th transmission resource. Additionally, the data transmitted by the UE should include the information from itself. For UE supporting directional beam transmission, in the transmission resources, the direction of the transmitted beam should at least be pointing to the (i+1)th UE. If i=M-1, the reception resource of the UE only includes the (i-1)th transmission resource. Additionally, the data transmitted by the UE should include the information from itself. For UE supporting directional beam transmission, in the transmission resources, the direction of the transmitted beam should at least be pointing to the (i-1)th UE.

If the index of a UE is 0, that is, the UE is a CUE, the PSCCH or PSSCH in which the UE transmits may include the control information of transmission for other UEs in the group, for example, a transmission power control parameter, an MCS of the PSSCH, and the like. The control information above should be forwarded to the UE with a high index value by the UE with a low index value in turn, and any UE should set or adjust the transmission mode according to the latest received control information (for example, the transmit power, the MCS of the PSSCH, and the like), so that the physical signals transmitted by any UE can be successfully demodulated by the neighboring UEs, while not interfering with other UEs outside of the platooning or being received by the other UEs outside of the platooning. In this way, the security of internal communication and the efficiency of resources are ensured.

If the index of a UE is M-1, that is, the last UE of the auto platooning, besides the information from itself and the information from the (i-1)th (i.e., (M-2)th) UE, the data transmitted by the UE may further include the configuration of the resource pool for communication in the group, and the latest received transmission control information. Therefore, for a new UE that intends to join the current platooning, it may acquire the configuration of the internal communication by coming close to the UE with index M-1.

Similar to the Embodiment 6, the different information transmitted by the UE may be distinguished by MAC SDUs. Additionally, if the jth UE intends to leave the vehicle as the platooning moves, the CUE shall indicate the index j of the UE in the transmitted control information. For any UE with index larger than j that successful decode the transmitted control information, they shall decrease their own index by one, and re-determine the location of the transmission resources based on the new index, and transmit data in the re-determined transmission resources in one or more transmission periods after receiving the transmission control information. In a preferred embodiment, the (j+1)th UE and (j−1)th UE shall increase the transmission power by X dB after successfully decoding the transmission control information above, where the value of X is configured by the CUE.

Additionally, as in the Embodiment 7, the first symbol in the transmission resource may be used for data transmission, that is, it does not need to be used to assist the reception of the AGC adjustment of UE. The density of the reference signals in the time domain of the transmission resources (including the PSCCH transmission resources and the PSSCH transmission resources) for internal communication should be less than the density of the reference signals in the time domain of the transmission resources for external communication.

Figure 18:
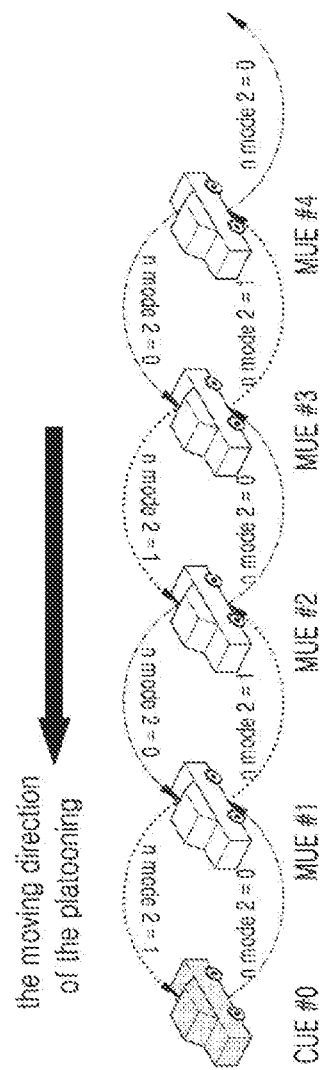
FIG. 18 is a schematic diagram of internal communication according to Embodiment 8 of the present disclosure.
Figure 19:
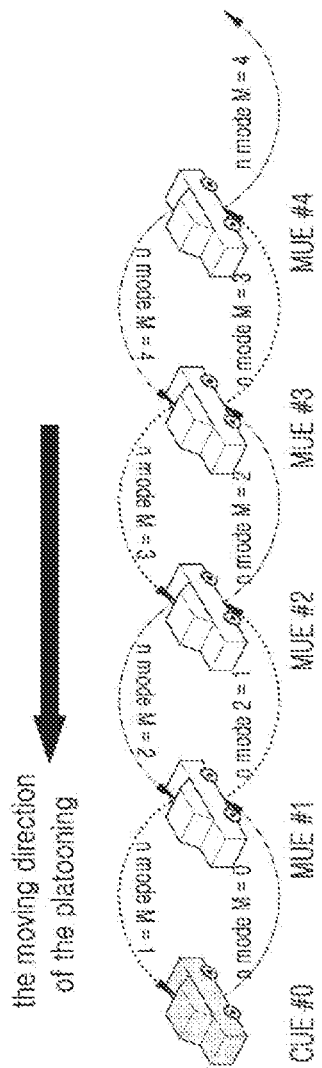
FIG. 19 is a schematic diagram of another internal communication according to Embodiment 8 of the present disclosure.

The method of internal communication described in the embodiment is shown in FIG. 18 and FIG. 19.

Embodiment 9

In the embodiment, the CUE may determine the carriers, the configuration of the resource pool, the transmission resources, and the reception resources used for the internal communication by the first to the fourth scheme for determining the resources. Additionally, the CUE configures one of the MUEs as a relay node, and the criterion for the CUE to select the relay node may include the geographical position of a MUE, a PSSCH reference signal received quality (PSSCH-RSRP) transmitted by other UEs in the group as measured by the MUE, and the like. If the CUE selects the relay MUE through the PSSCH-RSRP of other UEs in the group measured by the MUEs, any MUE in the group shall directly or indirectly report the result of the PSSCH-RSRP measurement to the CUE. The time slot in which the transmission resource of the relay MUE is located should be different from any of the time slots in which the transmission resources of other UEs (including CUE and other MUEs) in the group is located, while the time slot in which the transmission resource of the CUE is located and may be the same as that in which the transmission resource of the MUEs other than the relay MUE is located. The time slots may be the same. The relay MUE considers that the P time slots within the resource pool after the time slot in which the transmission resource of CUE is located compose a transmission period, and all the reception resources and transmission resources are repeated by the transmission period until the MUE receives a new indication of the signaling from the CUE. Where P is a particular value, and the MUE may determine the value of P by receiving signaling of the CUE or the NB when it joins the auto platooning, or it may determine the value of P according to the definition in a standard or pre-configuration. The reception resources of CUE may only include the transmission resource of the relay MUE, and the reception resources of the relay MUE shall include the transmission resources of all the other MUEs and CUE in the group, while the reception resources of the other MUEs in the group shall include at least the transmission resources of the relay MUE.

If the transmission resources of the relay MUE indicated by the CUE compose a resource set, the relay MUE can select transmission resources for transmitting one PSCCH and one PSSCH in the set by channel detection.

In the embodiment, the relaying MUE needs to aggregate the data information from the CUEs and other MUEs in the group and forward them to all the other UEs in the group. Similar to the Embodiment 6, the relay MUE can distinguish data information from different UEs through different MAC SDUs. If the MUE supports beam-based directional transmission, the MUE transmission beam should point in the direction of the CUE and the direction of the last MUE in the platooning.

Figure 20:
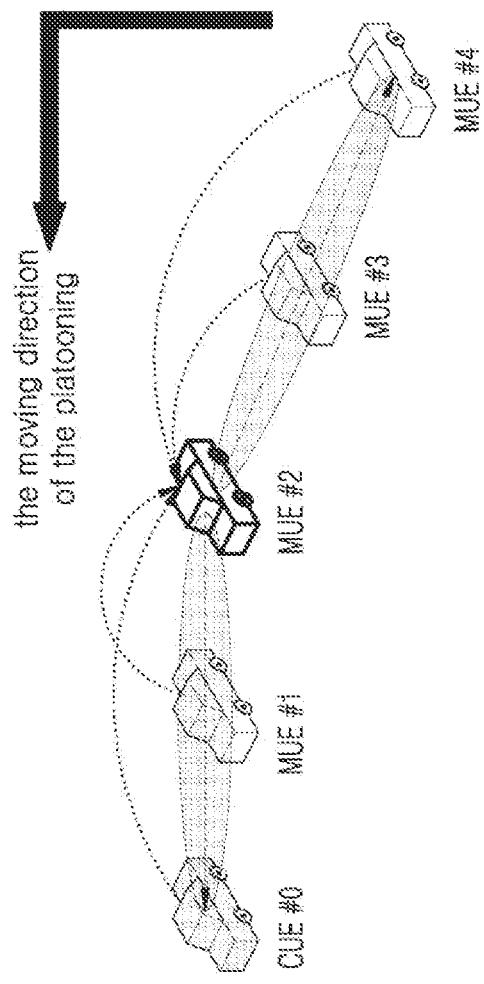
FIG. 20 is a schematic diagram of internal communication according to Embodiment 9 of the present disclosure.

The method of internal communication described in the embodiment is as shown in FIG. 20.

Figure 21:
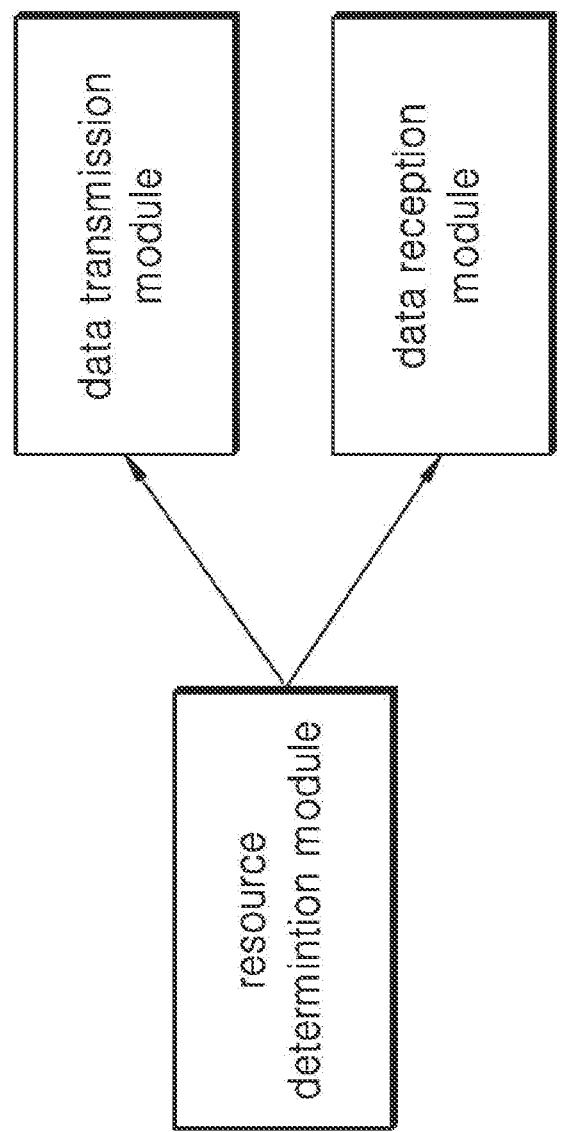
FIG. 21 is a block diagram illustrating the structure of a device for sidelink communication according to some embodiments of the present disclosure.

FIG. 21 illustrates a block diagram of the structure of a device for sidelink communication according to some embodiments of the present disclosure. It is only an example and is not intended to limit the scope of the disclosure as claimed.

As shown in FIG. 21, the sidelink communication device includes a resource determination module, a data transmission module, and a data reception module:

The resource determination module is configured to determine the locations of transmission resources and reception resources.

The data transmission module is configured to transmit data in the transmission resources determined by the resource determining module.

The data reception module is configured to receive data in the reception resources determined by the resource determination module.

Figure 22:
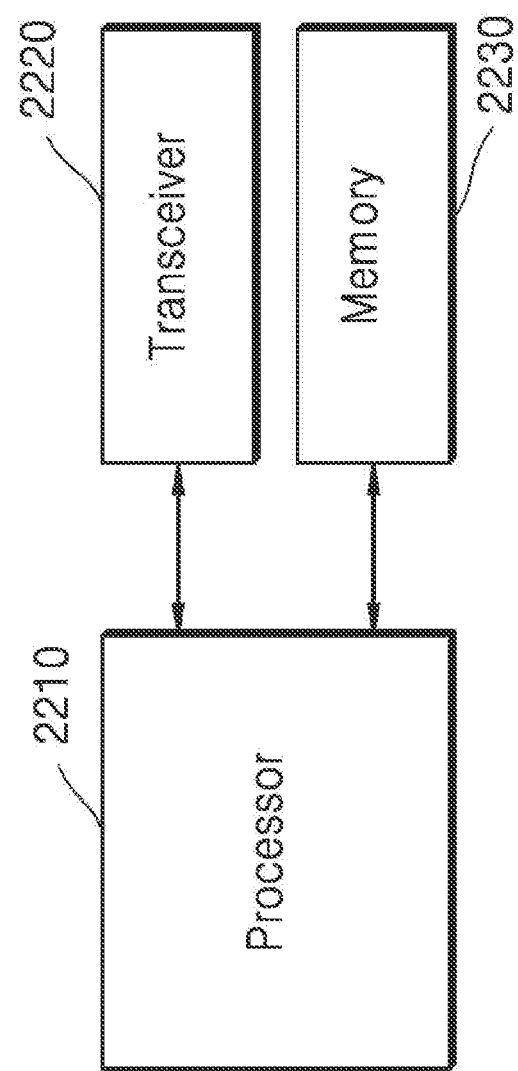
FIG. 22 is a block diagram illustrating the structure of a user equipment according to another embodiment of the present disclosure.

FIG. 22 is a block diagram illustrating the structure of a user equipment according to another embodiment of the present disclosure.

Referring to the FIG. 22, the user equipment 2200 may include a processor 2210, a transceiver 2220 and a memory 2230. However, all of the illustrated components are not essential. The user equipment 2200 may be implemented by more or less components than those illustrated in FIG. 22. In addition, the processor 2210 and the transceiver 2220 and the memory 2230 may be implemented as a single chip according to another embodiment. The processor 2210 may correspond to a first processing unit 1301 and a second processing unit 1302 of FIG. 13. The transceiver 2220 may correspond to a transmitting unit 1303 of FIG. 13.

The aforementioned components will now be described in detail.

The processor 2210 may include one or more processors or other processing devices that control the proposed function, process, and/or method. Operation of the user equipment 2200 may be implemented by the processor 2210.

The processor 2210 may sense each configured resource pool and/or each group of resources to obtain a result of sensing, the result of sensing containing a set of remaining candidate single TU resources of each resource pool. The processor 2210 may select, from the set of remaining candidate single TU resources of each resource pool and/or each group of resources, one candidate single TU resource as a transmission resource.

The transceiver 2220 may include a RF transmitter for up-converting and amplifying a transmitted signal, and a RF receiver for down-converting a frequency of a received signal. However, according to another embodiment, the transceiver 2220 may be implemented by more or less components than those illustrated in components.

The transceiver 2220 may be connected to the processor 2210 and transmit and/or receive a signal. The signal may include control information and data. In addition, the transceiver 2220 may receive the signal through a wireless channel and output the signal to the processor 2210. The transceiver 2220 may transmit a signal output from the processor 2210 through the wireless channel.

The memory 2230 may store the control information or the data included in a signal obtained by the device 2200. The memory 2230 may be connected to the processor 2210 and store at least one instruction or a protocol or a parameter for the proposed function, process, and/or method. The memory 2230 may include read-only memory (ROM) and/or random access memory (RAM) and/or hard disk and/or CD-ROM and/or DVD and/or other storage devices.

Figure 23:
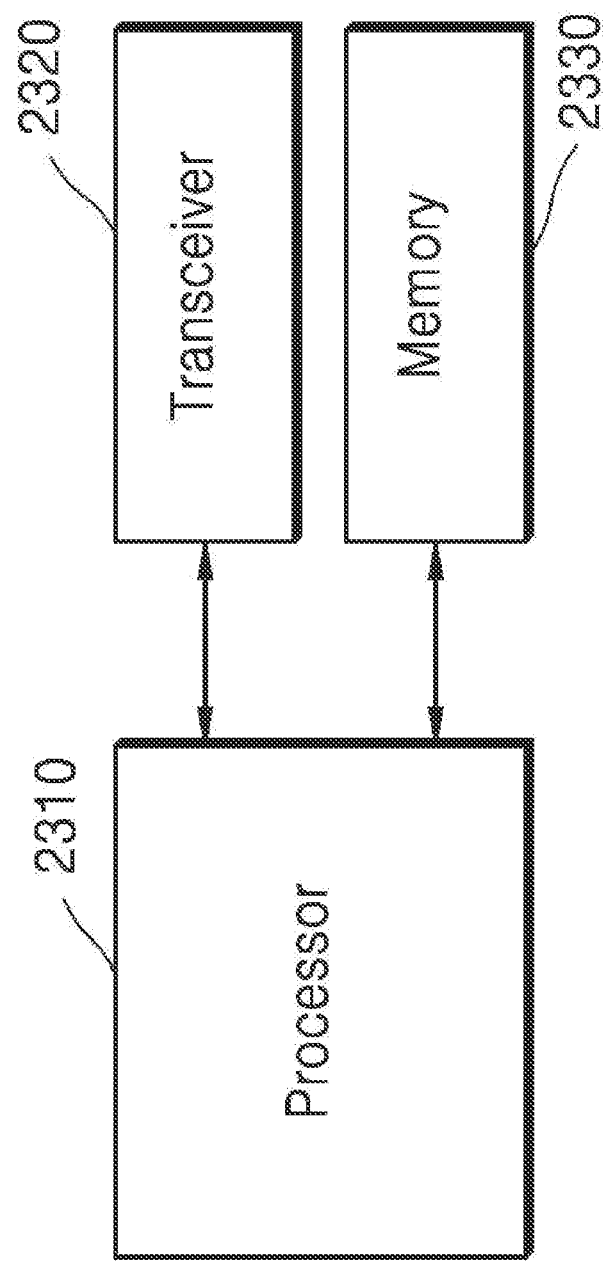
FIG. 23 is a block diagram illustrating the structure of a device for sidelink communication according to another embodiment of the present disclosure.

FIG. 23 is a block diagram illustrating the structure of a device for sidelink communication according to another embodiment of the present disclosure.

Referring to the FIG. 23, the device for sidelink communication 2300 may include a processor 2310, a transceiver 2320 and a memory 2330. However, all of the illustrated components are not essential. The device 2300 may be implemented by more or less components than those illustrated in FIG. 23. In addition, the processor 2310 and the transceiver 2320 and the memory 2330 may be implemented as a single chip according to another embodiment. The processor 2310 may correspond to a resource determination module of FIG. 21. The transceiver 2320 may correspond to data transmission module and data reception module of FIG. 21.

The aforementioned components will now be described in detail.

The processor 2310 may include one or more processors or other processing devices that control the proposed function, process, and/or method. Operation of the device 2300 may be implemented by the processor 2310.

The processor 2310 may determine the locations of transmission resources and reception resources.

The transceiver 2320 may include a RF transmitter for up-converting and amplifying a transmitted signal, and a RF receiver for down-converting a frequency of a received signal. However, according to another embodiment, the transceiver 2320 may be implemented by more or less components than those illustrated in components.

The transceiver 2320 may be connected to the processor 2310 and transmit and/or receive a signal. The signal may include control information and data. In addition, the transceiver 2320 may receive the signal through a wireless channel and output the signal to the processor 2310. The transceiver 2320 may transmit a signal output from the processor 2310 through the wireless channel.

The memory 2330 may store the control information or the data included in a signal obtained by the device 2300. The memory 2330 may be connected to the processor 2310 and store at least one instruction or a protocol or a parameter for the proposed function, process, and/or method. The memory 2330 may include read-only memory (ROM) and/or random access memory (RAM) and/or hard disk and/or CD-ROM and/or DVD and/or other storage devices.

It should be understood by those skilled in the art that the present disclosure involves apparatuses for performing one or more of operations as described in the present disclosure. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present disclosure may be alternated, changed, combined or deleted. Further, the operations, methods, other steps in the flows, measures and solutions already discussed in the present disclosure may also be alternated, changed, rearranged, decomposed, combined or deleted. Further, prior arts having the operations, methods, the steps in the flows, measures and solutions already discussed in the present disclosure may also be alternated, changed, rearranged, decomposed, combined or deleted.

The foregoing descriptions are merely preferred embodiments of the present disclosure. It should be noted that, for a person of ordinary skill in the art, various modifications and embellishments can be made without departing from the principle of the present disclosure. Such modifications and embellishments shall be regarded as falling into the protection scope of the present disclosure.

The invention claimed is:

1. A resource allocation method, the method comprising:
   sensing each configured resource pool to obtain a result of sensing, the result of sensing including a set of remaining candidate single time unit (TU) resources of each configured resource pool;
   selecting, from the set of remaining candidate single TU resources of each configured resource pool, one candidate single TU resource as a transmission resource; and
   transmitting, via the transmission resource, a packet;
   wherein the one candidate single TU resource is a time-frequency resource which consists of N TUs and M physical resource blocks (PRBs) and is used for transmitting a same packet, where N>1 and M≥1, and
   wherein the transmitting of the packet comprises:
      determining transmission parameters in each configured resource pool according to a channel busy ratio (CBR) of TUs in each configured resource pool;
      calculating a channel occupancy ratio (CR) of resources in each configured resource pool and/or the maximum value of the CR of the resources in each configured resource pool, respectively;
      determining reserved resources for transmitting the packet in each configured resource pool; and
      determining, according to the CBR and priority of each configured resource pool, whether to discard the reserved resources.

2. The method according to claim 1, wherein:
at least two resource pools are configured by multiple configuration signaling, respectively;
resources in the at least two configured resource pools are independent from each other; or
resources in the at least two resource pools satisfy a predefined relationship.

3. The method according to claim 1, wherein one of at least two resource pools is configured by one configuration signaling, and the other one or more of the at least two resource pools is determined according to the one resource pool and a predefined relationship.

4. The method according to claim 1, wherein the step of sensing of each configured resource pool to obtain a result of sensing comprises:
receiving, within a sensing window of a transmission resource pool, physical sidelink control channels (PSCCHs) transmitted by other user equipments (UEs), and determining time-frequency resources and priorities for physical sidelink shared channels (PSSCHs) according to the PSCCHs;
performing physical sidelink shared channel-reference signal receiving power (PSSCH-RSRP) measurement on the PSSCHs based on the time-frequency resources, and determining, according to a priority of each PSSCH, whether an RSRP measurement value of each PSSCH is higher than a predefined RSRP threshold;
in case that the RSRP measurement value of the PSSCH is higher than the predefined RSRP threshold and a corresponding time-frequency resource is located within a resource selection window of the transmission resource pool, excluding the time-frequency resource; and
in case that a number of remaining candidate single TU resources except for the time-frequency resource is less than a predefined threshold value, increasing the predefined RSRP threshold, and re-excluding a time-frequency resource until the number of remaining candidate single TU resources is greater than or equal to the predefined threshold value.

5. The method according to claim 4, wherein the excluded time-frequency resource in each resource pool uses the one candidate single TU resource, which consists of N TUs and M PRBs and is used for transmitting the same packet, as granularity.

6. The method according to claim 4, wherein the excluded time-frequency resource in each resource pool uses a time-frequency resource consisting of M PRBs within one TU as granularity.

7. The method according to claim 4, wherein in case that the remaining time-frequency resources contain a time-frequency resource for which no candidate single TU resource granularity can be formed, the time-frequency resource is removed from the remaining time-frequency resources.

8. The method according to claim 4, wherein the selecting, from the set of remaining candidate single TU resources of each configured resource pool, of one candidate single TU resource as the transmission resource comprises:
calculating a sidelink received signal strength indicator (S-RSSI) of the remaining candidate single TU resources in each transmission resource pool;
selecting a predefined number of candidate single TU resources in an order from the smallest to the largest S-RSSI; and
selecting, from the predefined number of candidate single TU resources, one candidate single TU resource as the transmission resource.

9. The method according to claim 4, wherein there is a predefined pattern relationship between N TUs in the one candidate single TU resource.

10. The method according to claim 4, wherein a difference in time between a first TU and a last TU among N TUs in the one candidate single TU resource does not exceed a predefined time threshold.

11. The method according to claim 1, further comprising:
receiving PSCCHs and/or PSSCHs in a reception resource pool, wherein the PSCCHs and/or PSSCHS are borne on N TUs in a candidate single TU resource.

12. The method according to claim 1, wherein a frequency-domain relationship between TUs among the N TUs is determined in any one of the following situations:
the N TUs use same frequency-domain resources;
the N TUs use different frequency-domain resources and a relationship between the frequency-domain resources corresponding to the N TUs is predefined; and
the N TUs satisfy a predefined pattern relationship.

13. The method according to claim 12, wherein in case that the N TUs use different frequency-domain resources, the method further comprises:
detecting a position of a frequency-domain resource for each of the N TUs; and
determining a position of a PSCCH and/or a PSSCH within each TU according to the position of the frequency-domain resource.

14. The method according to claim 1, wherein in case that the N TUs do not satisfy a predefined pattern relationship, the method further comprises:
receiving a PSCCH and/or a PSSCH within at least one of the N TUs; and
acquiring information indicative of the time and/or frequency domain of a PSCCH and/or a PSSCH of at least one another TU carried in the PSCCH.

15. The method according to claim 1, wherein the packet to be transmitted is transmitted and/or received based on beams.

16. The method according to claim 15, wherein:
for a group of UEs, a direction of transmission beams within each corresponding transmission resource pool complies with a same rule; and/or
for a group of UEs, a direction of reception beams within each corresponding reception resource pool complies with a same rule.

17. The method according to claim 1, wherein any one of the following processing procedures is determined according to a service type:
configuring a resource pool;
determining a candidate single TU resource;
selecting a transmission resource on the basis of sensing; and
determining a direction of a transmission and/or reception beam.

18. A user equipment (UE), comprising:
a transceiver; and
at least one processor configured to:
sense each configured resource pool to obtain a result of sensing, the result of sensing including a set of remaining candidate single time unit (TU) resources of each configured resource pool, and select, from the set of remaining candidate single TU resources of each configured resource pool, one candidate single TU resource as a transmission resource, and transmit, via the transmission resource, a packet;

wherein the one candidate single TU resource is a time-frequency resource which consists of N TUs and M physical resource blocks (PRBs) and is used for transmitting a same packet, where $N>1$ and $M \geq 1$, and wherein the at least one processor is further configured to:
  determine transmission parameters in each configured resource pool according to a channel busy ratio (CBR) of TUs in each configured resource pool,
  calculate a channel occupancy ratio (CR) of resources in each configured resource pool and/or the maximum value of the CR of the resources in each configured resource pool, respectively,
  determine reserved resources for transmitting the packet in each configured resource pool, and
  determine, according to the CBR and priority of each configured resource pool, whether to discard the reserved resources.

\* \* \* \* \*